United States Patent
Mochizuki et al.

(10) Patent No.: US 8,015,428 B2
(45) Date of Patent: Sep. 6, 2011

(54) PROCESSING DEVICE AND CLOCK CONTROL METHOD

(75) Inventors: Yoshinori Mochizuki, Yokohama (JP); Masaharu Ukeda, Yokohama (JP); Shigemasa Shiota, Kodaira (JP)

(73) Assignee: Renesas Electronics Corporation, Kanagawa (JP)

( * ) Notice: Subject to any disclaimer, the term of this patent is extended or adjusted under 35 U.S.C. 154(b) by 612 days.

(21) Appl. No.: 12/136,988

(22) Filed: Jun. 11, 2008

(65) Prior Publication Data

US 2008/0313487 A1 Dec. 18, 2008

(30) Foreign Application Priority Data

Jun. 12, 2007 (JP) ................................. 2007-155453
Mar. 17, 2008 (JP) ................................. 2008-067068

(51) Int. Cl.
*G06F 1/04* (2006.01)

(52) U.S. Cl. .......... 713/600; 713/501; 713/601; 710/29; 710/58; 710/59; 710/305

(58) Field of Classification Search .................. 710/305, 710/58–64, 29; 713/501, 600, 601
See application file for complete search history.

(56) References Cited

U.S. PATENT DOCUMENTS

| | | | | |
|---|---|---|---|---|
| 4,561,024 A * | 12/1985 | Tamura | ......................... | 358/451 |
| 5,086,387 A * | 2/1992 | Arroyo et al. | ................. | 713/501 |
| 5,115,503 A * | 5/1992 | Durkin | ........................ | 713/501 |
| 5,134,703 A * | 7/1992 | Bumbarger | ................... | 713/501 |
| 5,155,841 A * | 10/1992 | Bumbarger | ................... | 713/501 |
| 5,263,172 A * | 11/1993 | Olnowich | ................... | 710/307 |
| 5,274,678 A * | 12/1993 | Ferolito et al. | ............... | 375/357 |
| 5,313,619 A * | 5/1994 | Bumbarger | ................... | 713/500 |
| 5,546,567 A * | 8/1996 | Nakamura | ................... | 713/501 |
| 5,586,151 A * | 12/1996 | Minagawa | ................... | 375/377 |
| 5,678,065 A * | 10/1997 | Lee et al. | ........................ | 710/60 |
| 5,706,484 A * | 1/1998 | Mozdzen et al. | ............. | 713/400 |
| 5,758,132 A * | 5/1998 | Str.ang.hlin | ................... | 713/501 |
| 5,761,533 A * | 6/1998 | Aldereguia et al. | ............. | 710/25 |
| 5,794,019 A * | 8/1998 | Genduso et al. | ............. | 713/400 |
| 5,805,912 A * | 9/1998 | Johnson et al. | ................. | 712/40 |
| 5,815,692 A * | 9/1998 | McDermott | ................. | 713/501 |

(Continued)

OTHER PUBLICATIONS

ISO/IEC. ISO/IEC 7816-2. International Standard. Second edition. Oct. 15, 2007.*

(Continued)

Primary Examiner — Matthew D Spittle
(74) Attorney, Agent, or Firm — Mattingly & Malur, PC

(57) ABSTRACT

A processing device comprises an interface and its control circuit for performing data transfer in synchronization with an external clock, an internal oscillator, and an interface and its control circuit for performing data transfer by using an internal clock generated by the internal oscillator. In the processing device, a clock control circuit that switches a system clock between the internal clock and the external clock in accordance with the interface is provided. When the system clock is switched, the switching is performed after the CPU is set in a sleep state, and after the switching is completed, the sleep state of the CPU is released to restart the operation.

11 Claims, 30 Drawing Sheets

U.S. PATENT DOCUMENTS

| | | | | |
|---|---|---|---|---|
| 5,923,621 A | * | 7/1999 | Kanekal et al. | 368/117 |
| 6,021,500 A | * | 2/2000 | Wang et al. | 713/320 |
| 6,055,642 A | * | 4/2000 | Ikemoto | 713/322 |
| 6,194,940 B1 | * | 2/2001 | Hunter et al. | 327/298 |
| 6,473,852 B1 | * | 10/2002 | Hanjani | 713/1 |
| 6,496,888 B1 | * | 12/2002 | Pole, II | 710/110 |
| 6,948,086 B2 | * | 9/2005 | Iwasa | 713/500 |
| 7,038,506 B2 | * | 5/2006 | Om et al. | 327/145 |
| 7,096,373 B2 | * | 8/2006 | Oh | 713/320 |
| 7,433,263 B2 | * | 10/2008 | Kim | 365/233.1 |

OTHER PUBLICATIONS

ISO/IEC. ISO/IEC 7816-3. International Standard. Third Edition. Nov. 1, 2006.*
NXP Semiconductors. AN10766. Clock source switching on the fly. Application Note. Rev. 01. Dec. 2, 2008.*
Microchip Technology Inc. Section 7. Oscillator. 2007.*
Freescale Semiconductor. M68HC08 Microcontrollers. Rev. 2. Mar. 2010.*

* cited by examiner

PROCESSING DEVICE AND CLOCK CONTROL METHOD

CLAIM OF PRIORITY

The present application claims priority from Japanese Patent Applications No. 2007-155453 filed on Jun. 12, 2007 and No. 2008-067068 filed on Mar. 17, 2008, the contents of which are hereby incorporated by reference into this application.

TECHNICAL FIELD OF THE INVENTION

The present invention relates to a processing device having a plurality of interfaces for data transfer and a clock control method thereof. More particularly, it relates to a technology effectively applied to a processing device such as an IC card complying with ISO 7816.

BACKGROUND OF THE INVENTION

In ISO 7816 standards for IC cards provided with an external terminal, a processing device having an external terminal complying with ISO 7816-2 can perform not only data transfer complying with ISO 7816-3 but also USB (Universal Serial Bus) transfer complying with ISO 7816-12. Here, in ISO 7816-12 specifications, an external terminal device does not supply a clock to the processing device. Therefore, when performing USB transfer complying with ISO 7816-12, it is required to operate the processing device by the use of a clock generated in the processing device in principle.

Also, in the data transfer complying with ISO 7816-3, specifications about a clock used in the data transfer between an external terminal device and a processing device are defined, but specifications about a clock used in the processing device are not defined. When a clock generated in the processing device is used, since it is required to operate modules such as an oscillator and a PLL, power consumption increases in comparison with the case of the operation using only a clock supplied from an external terminal device. Therefore, a clock supplied from an external terminal device is used for the operation in some cases.

SUMMARY OF THE INVENTION

The data transfer complying with ISO 7816-3 and the USB transfer complying with ISO 7816-12 can be simultaneously performed because external terminals to be used are different from each other. Here, for example, when the USB transfer complying with ISO 7816-12 is activated during the data transfer complying with ISO 7816-3, it is required to switch the clock used in the processing device from an external clock to an internal clock. However, switching the clock during the operation of the processing device may cause a malfunction of the CPU and other components in the processing device due to an influence of the noise or the like.

Therefore, an object of the present invention is to provide a processing device having an interface for performing data transfer in synchronization with an external clock and an interface for performing data transfer by using an internal clock without using an external clock, in particular, a processing device having an external terminal complying with ISO 7816 and interfaces complying with ISO 7816-3 and ISO 7816-12 and capable of switching a clock used by the processing device in accordance with an interface used in data transfer with an external terminal device, and a clock control method thereof.

The typical ones of the inventions disclosed in this application will be briefly described as follows.

The present invention provides a processing device and a clock control method thereof, the processing device comprising: a first interface and its control circuit for performing data transfer with an external terminal device in synchronization with an external clock supplied from the external terminal device; a clock generation circuit that generates a clock; and a second interface and its control circuit for performing data transfer with the external terminal device by using an internal clock generated by the clock generation circuit. The processing device further comprises: a clock control circuit that switches a system clock used by the CPU and other modules between the external clock and the internal clock in accordance with either one of the first and second interfaces to be used by the processing device in the data transfer with the external terminal device. When the system clock is switched between the external clock and the internal clock, the CPU is caused to be set in a sleep state and then the switching is performed, and after the switching is completed, the sleep state of the CPU is released to restart the operation.

The effects obtained by typical aspects of the present invention will be briefly described below.

According to the present invention, when data transfer is performed by one processing device through a plurality of interfaces, in particular, when data transfer complying with ISO 7816-3 and USB transfer complying with ISO 7816-12 are performed, the clock used in the processing device can be dynamically switched in accordance with the interface to be used, and thus, it becomes possible to simultaneously perform both the data transfer complying with ISO 7816-3 and the USB transfer complying with ISO 7816-12.

BRIEF DESCRIPTIONS OF THE DRAWINGS

Figure 29:
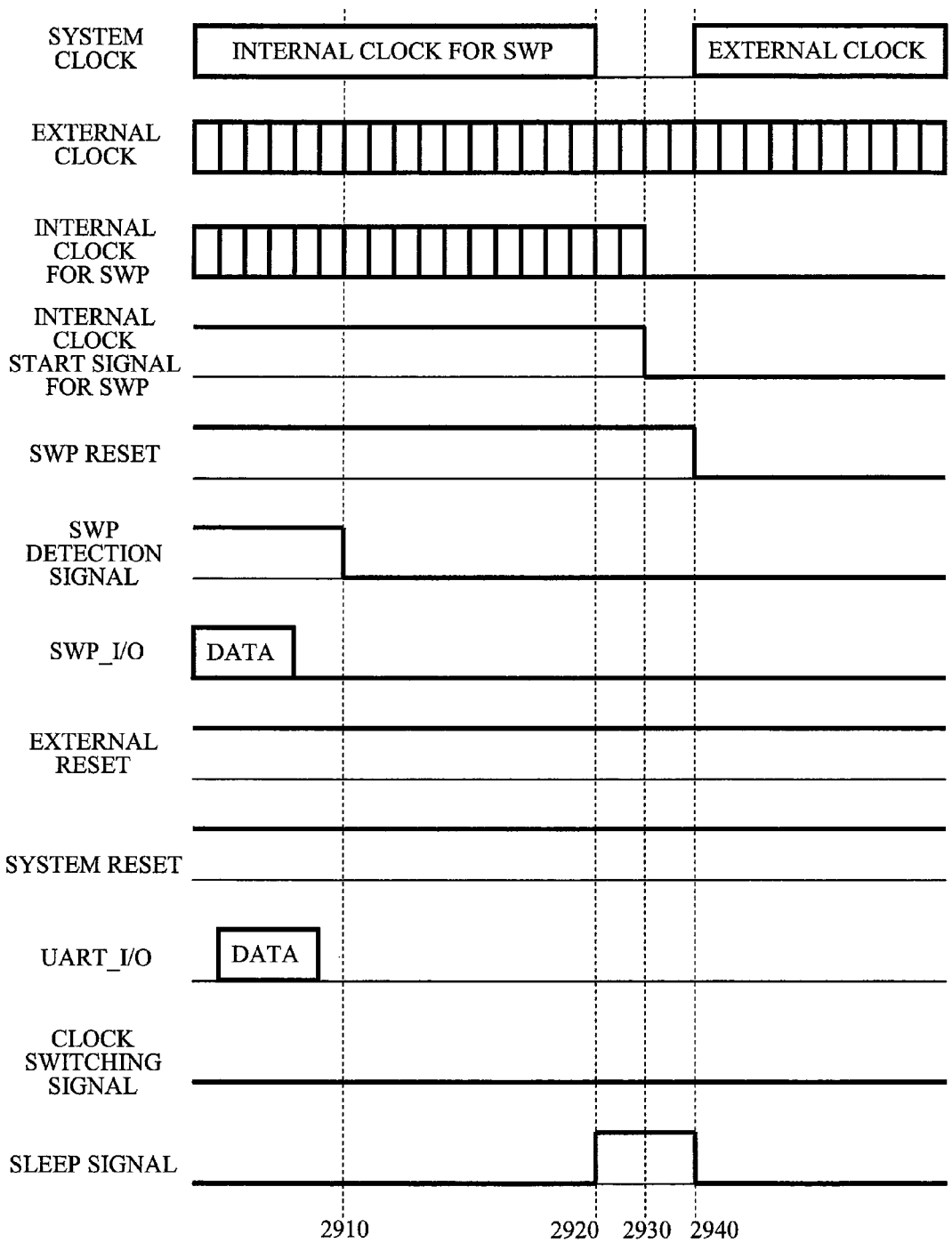
Figure 30:
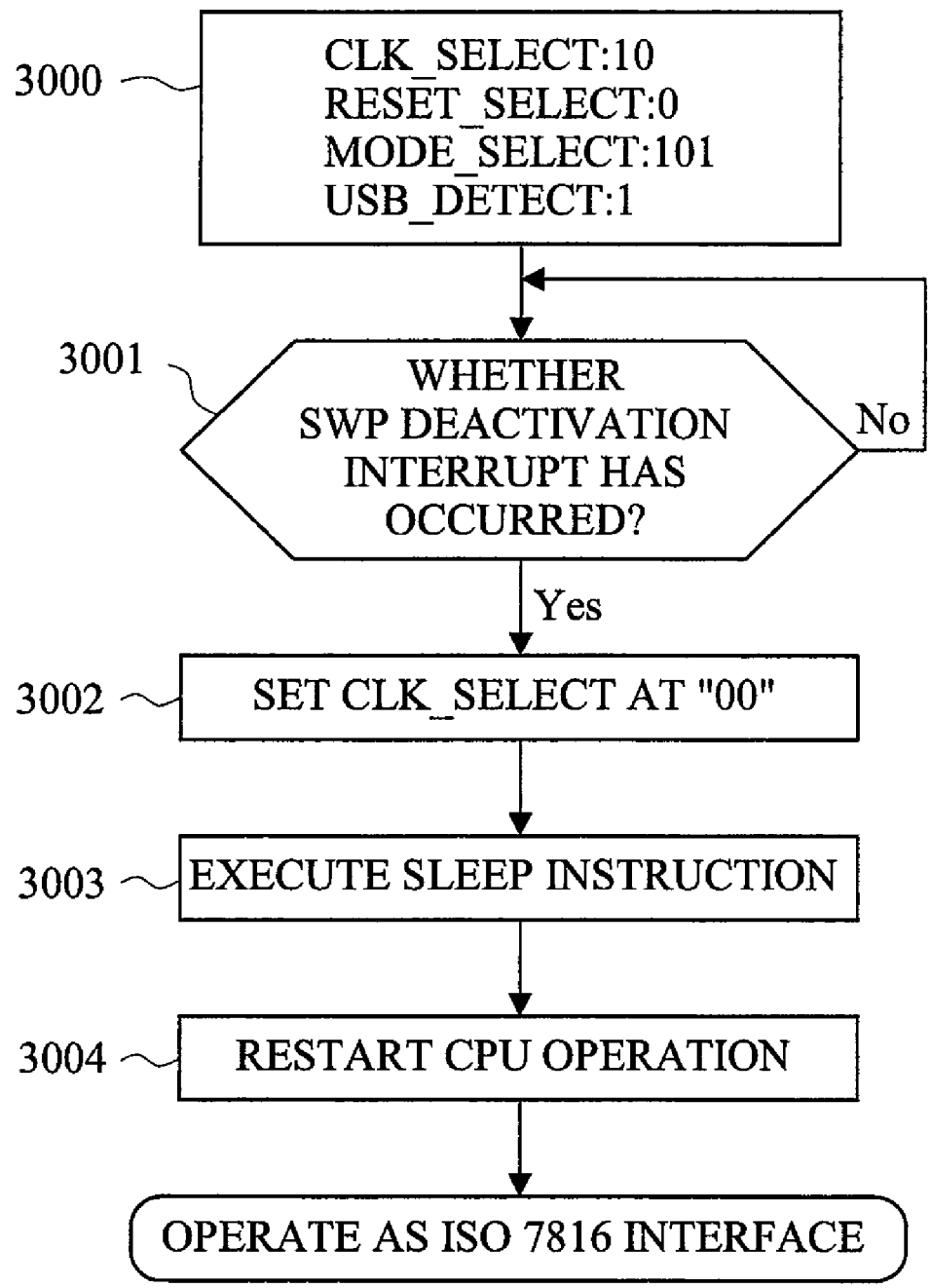

FIG. 29 is an example of a timing chart of the SWP interface deactivation procedure during the operation with both an ISO 7816 interface and an SWP interface in the processing device according to the third embodiment of the present invention; and FIG. 30 is a flow diagram showing an example of a flow in an SWP interface deactivation procedure during an operation with both an ISO 7816 interface and an SWP interface by the use of firmware in the processing device according to the third embodiment of the present invention.

DESCRIPTIONS OF THE PREFERRED EMBODIMENTS

Hereinafter, embodiments of the present invention will be described in detail with reference to the accompanying drawings. Note that components having the same function are denoted by the same reference numbers throughout the drawings for describing the embodiment, and the repetitive description thereof will be omitted.

First Embodiment

Figure 1:
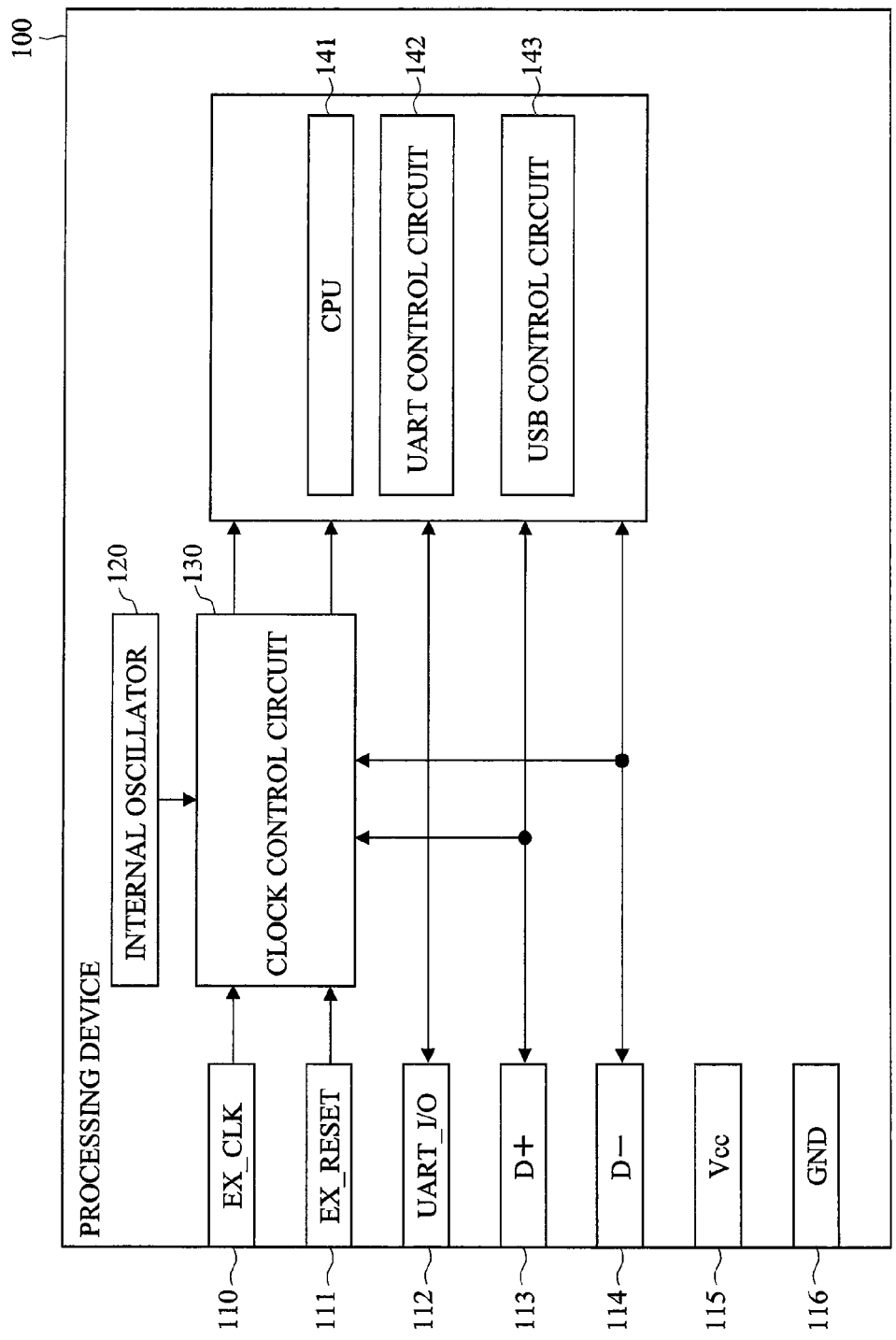
FIG. 1 is a drawing showing an example of the internal configuration of a processing device according to a first embodiment of the present invention.

A processing device according to a first embodiment of the present invention will be described. FIG. 1 is a drawing showing an example of an internal configuration of the processing device according to the present embodiment. Also, FIG. 2 is a drawing showing an example of arrangement of external terminals in the processing device according to the present embodiment.

In FIG. 1, a processing device 100 includes, as ISO 7816 compatible external interfaces, EX_CLK 110, EX_RESET 111, UART_I/O 112, D+ 113, D− 114, Vcc 115, and GND 116. Further, it also includes an internal oscillator 120, a clock control circuit 130, a CPU 141, a UART control circuit 142, and a USB control circuit 143.

The processing device 100 mainly corresponds to an IC card chip and a memory card with a security function. However, the processing device 100 is not restricted to these and any devices can be applied thereto as long as they have a plurality of interfaces for data transfer. Also, the processing device 100 may be configured not only as one chip but also as a separate chip for each circuit or each collection of circuits.

Figure 2:
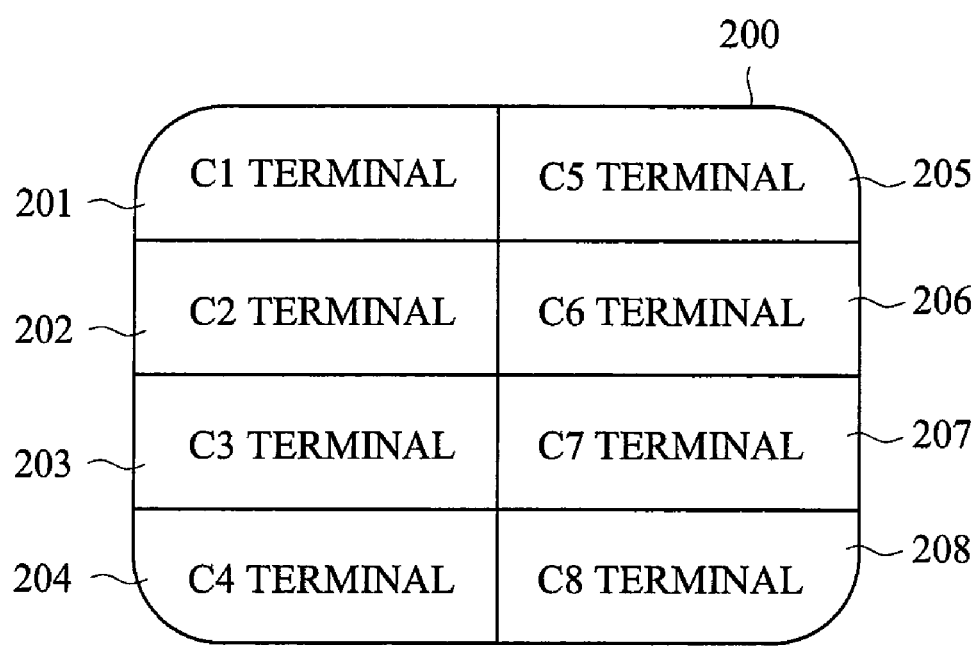
FIG. 2 is a drawing showing an example of arrangement of external terminals in the processing device according to the first embodiment of the present invention.

EX_CLK 110 is an external interface for inputting a clock signal required for performing a process complying with ISO 7816 from an external terminal device to the processing device 100, and a C3 terminal 203 in FIG. 2 is assigned thereto in ISO 7816. Hereinafter, a clock supplied via EX_CLK 110 is referred to as an external clock. EX_RESET 111 is an external interface for inputting a reset signal from an external terminal device to the processing device 100, and a C2 terminal 202 in FIG. 2 is assigned thereto in ISO 7816. Hereinafter, a reset via EX_RESET 111 is referred to as an external reset.

UART_I/O 112 is an external interface for transmission and reception of an APDU (Application Protocol Data Unit) between an external terminal device and the processing device 100, and a C7 terminal 207 is assigned thereto in ISO 7816. D+ 113 and D− 114 are used for transfer of commands and data between an external terminal device and the processing device 100 in the USB transfer complying with ISO 7816-12, and a C4 terminal 204 is assigned as D+ 113 and a C8 terminal 208 is assigned as D− 114 in ISO 7816.

Vcc 115 is an external interface that obtains an input voltage to the processing device 100, and a C1 terminal 201 is assigned thereto in ISO 7816. GND 116 is a ground line to the processing device 100, and a C5 terminal 205 is assigned thereto in ISO 7816. Note that, in the data transfer complying with ISO 7816-3 and the USB transfer complying with ISO 7816-12, the assignment of the external terminals to the external interfaces does not influence the essence of the processing device 100 and the clock control method in the present embodiment as long as the assignment is clarified.

The UART control circuit 142 is a circuit for achieving APDU transfer defined in ISO 7816-3. Hereinafter, an interface for performing APDU transfer complying with ISO 7816-3 in synchronization with an external clock is referred to as an ISO 7816 interface. The USB control circuit 143 is a circuit for achieving data transfer complying with USB standards defined in ISO 7816-12. Hereinafter, an interface for performing data transfer complying with USB standards defined in ISO 7816-12 is referred to as a USB interface. Also, hereinafter, the UART control circuit 142 and the USB control circuit 143 are generally referred to as interface control circuits.

The functions of each interface control circuit can be mounted so that the CPU 141 can perform such functions. However, if each interface control circuit is separately provided and the power for operating each circuit can be controlled separately from the power for operating the CPU 141, when either one of the interfaces is selected in the data transfer, the power consumption of the processing device 100 can be reduced by stopping the power supply to the other interface control circuit.

An external clock can be used even in the case of data transfer with the USB interface. However, since its operation frequency is as slow as about 4 MHz, this is not suitable for the data transfer with the USB interface in which a large amount of data is transferred. Further, there is no guarantee that an external clock will be continuously supplied from an external terminal device during the process with the USB interface.

Accordingly, the processing device 100 according to the present embodiment has a configuration in which the internal oscillator 120 is provided as a clock generation circuit and a clock generated by the internal oscillator 120 is used in the case of a process with the USB interface. Note that the internal oscillator 120 is not restricted to that provided inside the processing device 100 but may be connected from outside the processing device 100. Hereinafter, a clock generated by the internal oscillator 120 is referred to as an internal clock.

Figure 3:
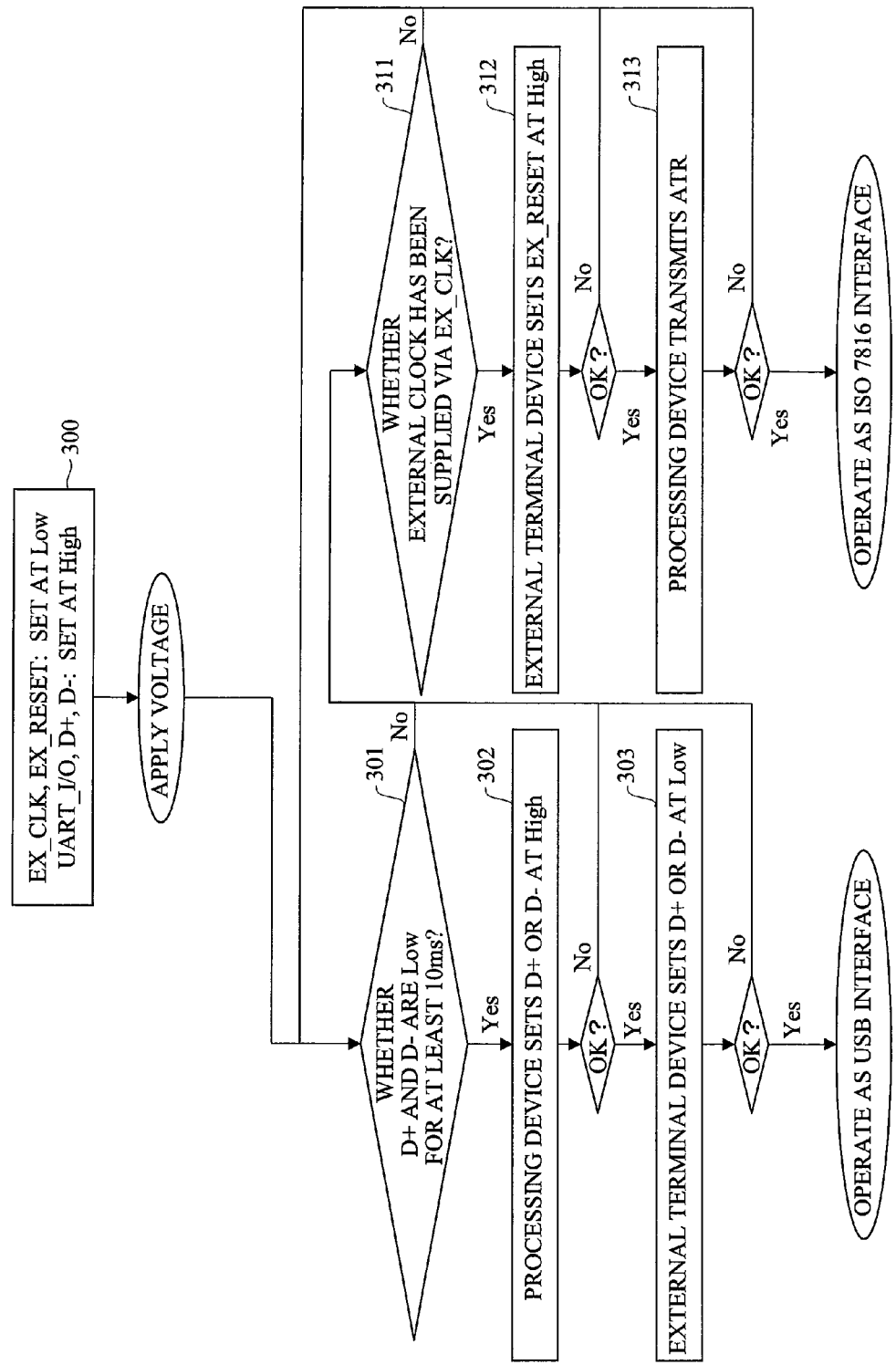
FIG. 3 is a drawing showing an example of the flow of an initial operation in the processing device according to the first embodiment of the present invention.

FIG. 3 is a drawing showing an example of the flow of an initial operation of an IC card such as the processing device 100 having an ISO 7816 interface and a USB interface. First, before a voltage is applied, in step 300, EX_CLK 110 is set in a Low state, EX_RESET 111 is set in a Low state, UART_I/O 112 is set in a High state, D+ 113 is set in a High state, and D− 114 is set in a High state. After a voltage is applied and reaches a defined operation voltage, it is determined whether D+ 113 and D− 114 are in a Low state for at least 10 ms (step 301). Only when the determination condition in step 301 is satisfied, a USB interface activation procedure which will be described below is performed.

In the USB interface activation procedure, the processing device 100 first sets D+ 113 in a High state when the USB interface supports Full Speed or High Speed in the USB specifications, and it sets D− 114 in a High state when the USB interface supports only Low speed (step 302). Next, since D+ 113 or D− 114 is set in a High state, an external terminal device connected to the processing device 100 detects that the processing device 100 having a USB interface has been connected, and sets D+ 113 or D− 114, which has been set in a High state, in a Low state (step 303).

Only when the processes in steps 301 to 303 are normally performed, the USB interface is activated, and the processing device 100 operates as a device for performing the data transfer with the USB interface. If the processes in steps 301 to 303 have not been normally performed, it is determined whether an external clock with an operation frequency of about 4 MHz is to be supplied or has been supplied from an external device via EX_CLK 110 (step 311). If such an external clock is to be supplied or has been supplied, an ISO 7816 interface activation procedure which will be described below is performed.

In the ISO 7816 interface activation procedure, the external terminal device first sets EX_RESET 111 in a High state during 400 clocks after the first external clock is supplied (step 312). Next, the processing device 100 transmits ATR (Answer To Reset) to the external terminal device via UART_I/O 112 during 40,000 clocks after EX_RESET 111 is set in a High state (step 313).

Only when the processes in steps 311 to 313 are normally performed, the ISO 7816 interface is activated, and the processing device 100 operates as a device for performing the data transfer with the ISO 7816 interface. If the processes in steps 301 to 303 and the processes in steps 311 to 313 have not been normally performed, the processing device 100 waits until either one of the condition that D+ 113 or D− 114 is in a Low state for at least 10 ms (step 301) and the condition that an external clock is supplied via EX_CLK 110 (step 311) is satisfied.

In order to perform the process of activating each interface as described above, the processing device 100 has a configuration provided with the clock control circuit 130 as shown in FIG. 1. The clock control circuit 130 is a module that selects a clock and a reset to be supplied to the CPU 141, each interface control circuit and others in accordance with the interface used in data transfer by the processing device 100 with the external terminal device. Hereinafter, the clock to be supplied to the CPU 141, each interface control circuit and others is referred to as a system clock.

Figure 4:
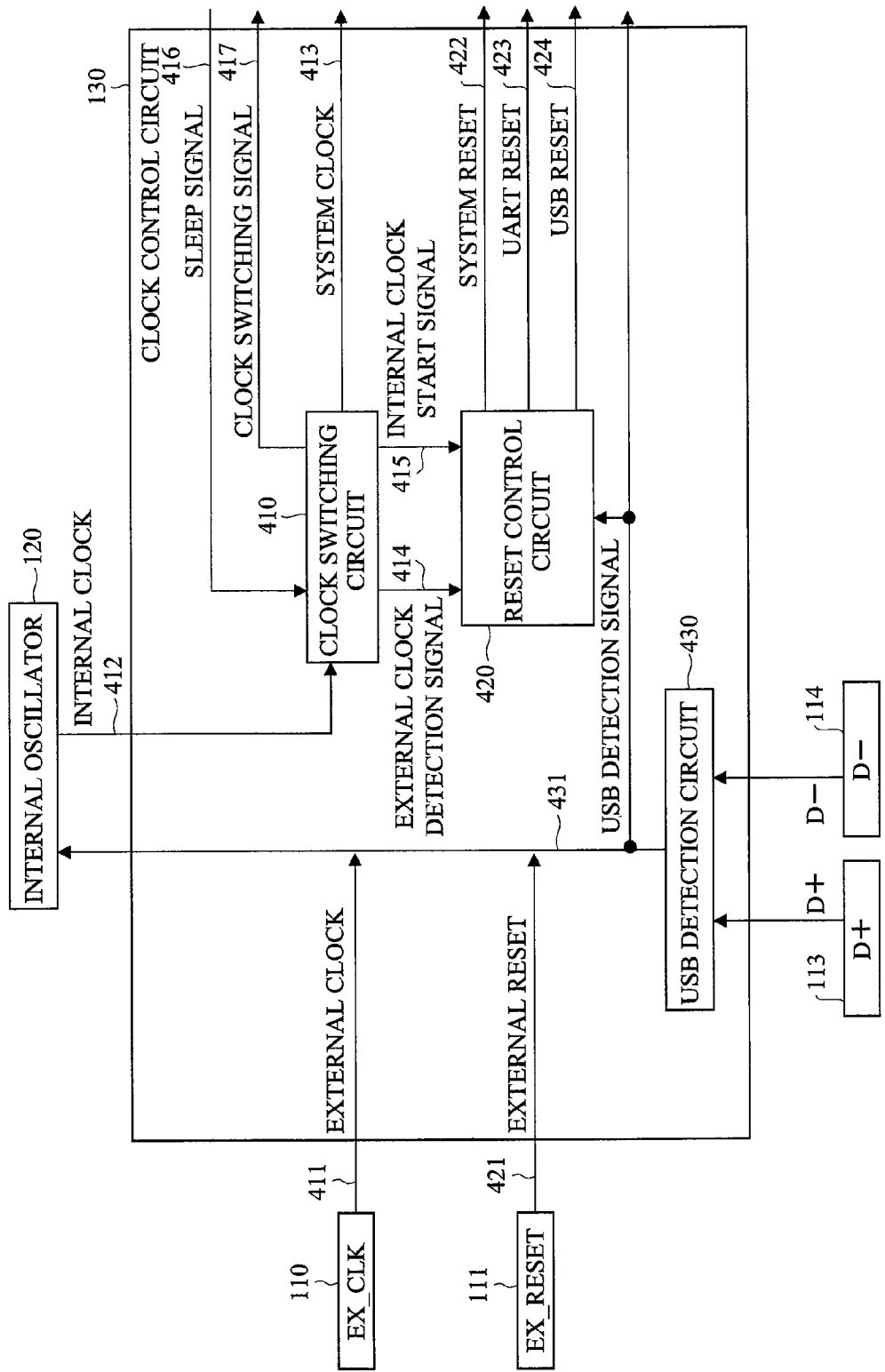
FIG. 4 is a drawing showing a configuration example of modules included in a clock control circuit in the processing device according to the first embodiment of the present invention.

FIG. 4 is a drawing showing a configuration example of modules included in the clock control circuit 130 according to the present embodiment. The clock control circuit 130 includes a clock switching circuit 410, a reset control circuit 420 and a USB detection circuit 430. The clock switching circuit 410 is a module that selects a system clock 413 to be supplied to the CPU 141, each interface control circuit and others from an external clock 411 supplied from the external terminal device via EX_CLK 110 and an internal clock 412 generated by the internal oscillator 120.

Also, the clock switching circuit 410 supplies an external clock detection signal 414 and an internal clock start signal 415 to the reset control circuit 420. Here, the external clock detection signal 414 is a signal to be a High state when it is detected that the external clock 411 has been supplied via EX_CLK 110. Also, the internal clock start signal 415 is a signal to be a High state when the internal clock 412 generated by the internal oscillator 120 is supplied to the CPU 141, each interface control circuit and others.

Furthermore, the clock switching circuit 410 is configured to receive an input of a sleep signal 416 from the CPU 141 and output a clock switching signal 417 to the CPU 141 and other modules. These signals will be further described below.

The reset control circuit 420 is a module that controls the resets supplied to the CPU 141, each interface control circuit and others. The resets supplied by the reset control circuit 420 include a system reset 422, a UART reset 423 and a USB reset 424. The system reset 422 is a signal for supplying a reset to all modules in the processing device 100. The UART reset 423 is a signal for supplying a reset only to a module required for the processing of the data transferred via the ISO 7816 interface. The USB reset 424 is a signal for supplying a reset only to a module required for the processing of the data transferred via the USB interface.

The USB detection circuit 430 is a module that monitors the state of signal lines of D+ 113 and D− 114, and causes a USB detection signal 431 to be set in a High state when detecting that the signal lines of D+ 113 and D− 114 are both in a Low state for at least 10 ms. The USB detection signal 431 is a signal for notifying the CPU 141 and other modules that the data is transferred with the USB interface.

The internal oscillator 120 starts clock generation when the USB detection signal 431 becomes a High state. However, the supply of the clock to the CPU 141 and others is required to wait until its oscillation is stabilized. It is normally possible to know the time required for stabilizing the clock from the specifications of the oscillator and others. Therefore, the clock is supplied to the CPU 141 after the stabilization of the oscillation by using a dedicated hardware timer created based on that required time. The timer may be inside the clock switching circuit 410 or the internal oscillator 120.

Figure 5:
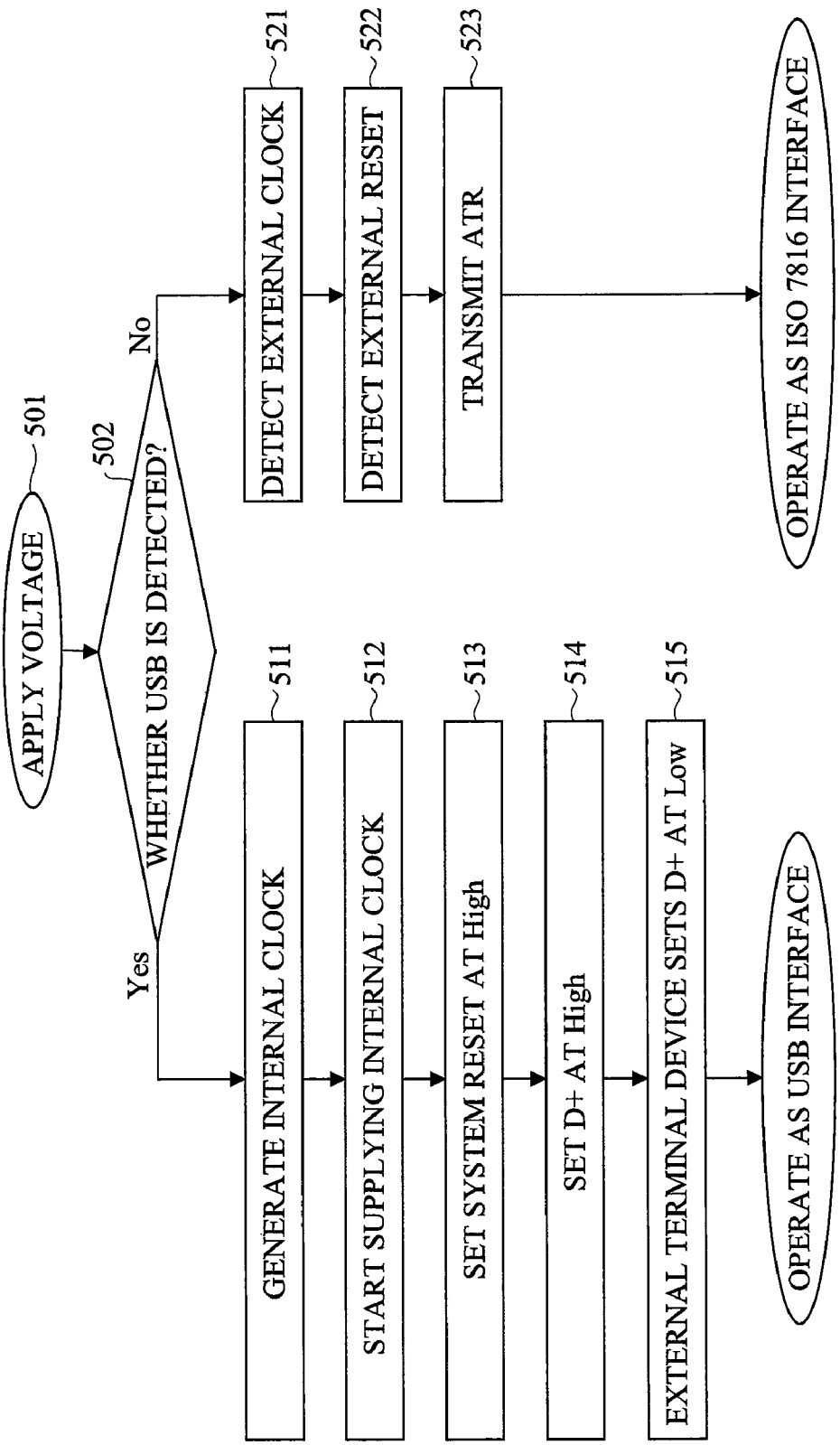
FIG. 5 is a flow diagram showing an example of a USB interface activation procedure and an ISO 7816 interface activation procedure in the processing device according to the first embodiment of the present invention.
Figure 6:
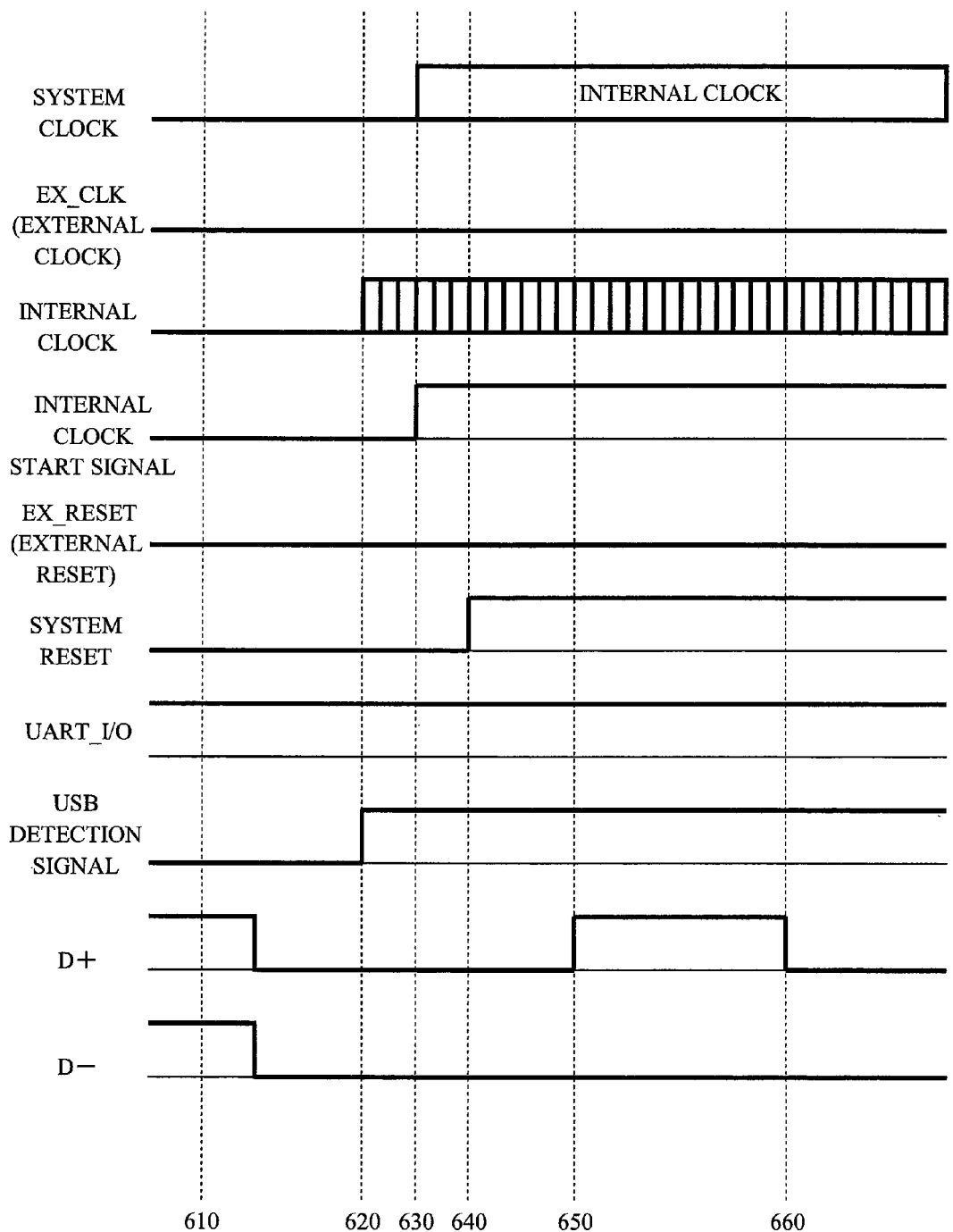
FIG. 6 is an example of a timing chart of the USB interface activation procedure in the processing device according to the first embodiment of the present invention.

A USB interface activation method and an ISO 7816 interface activation method in the processing device 100 according to the present embodiment will be described below. FIG. 5 is a flow diagram showing an example of a USB interface activation procedure and an ISO 7816 interface activation procedure in the processing device 100 according to the present embodiment. Also, FIG. 6 is an example of a timing chart of the USB interface activation procedure in the processing device 100 according to the present embodiment. Also, FIG. 7 is an example of a timing chart of the ISO 7816 interface activation procedure in the processing device 100 according to the present embodiment.

Figure 7:
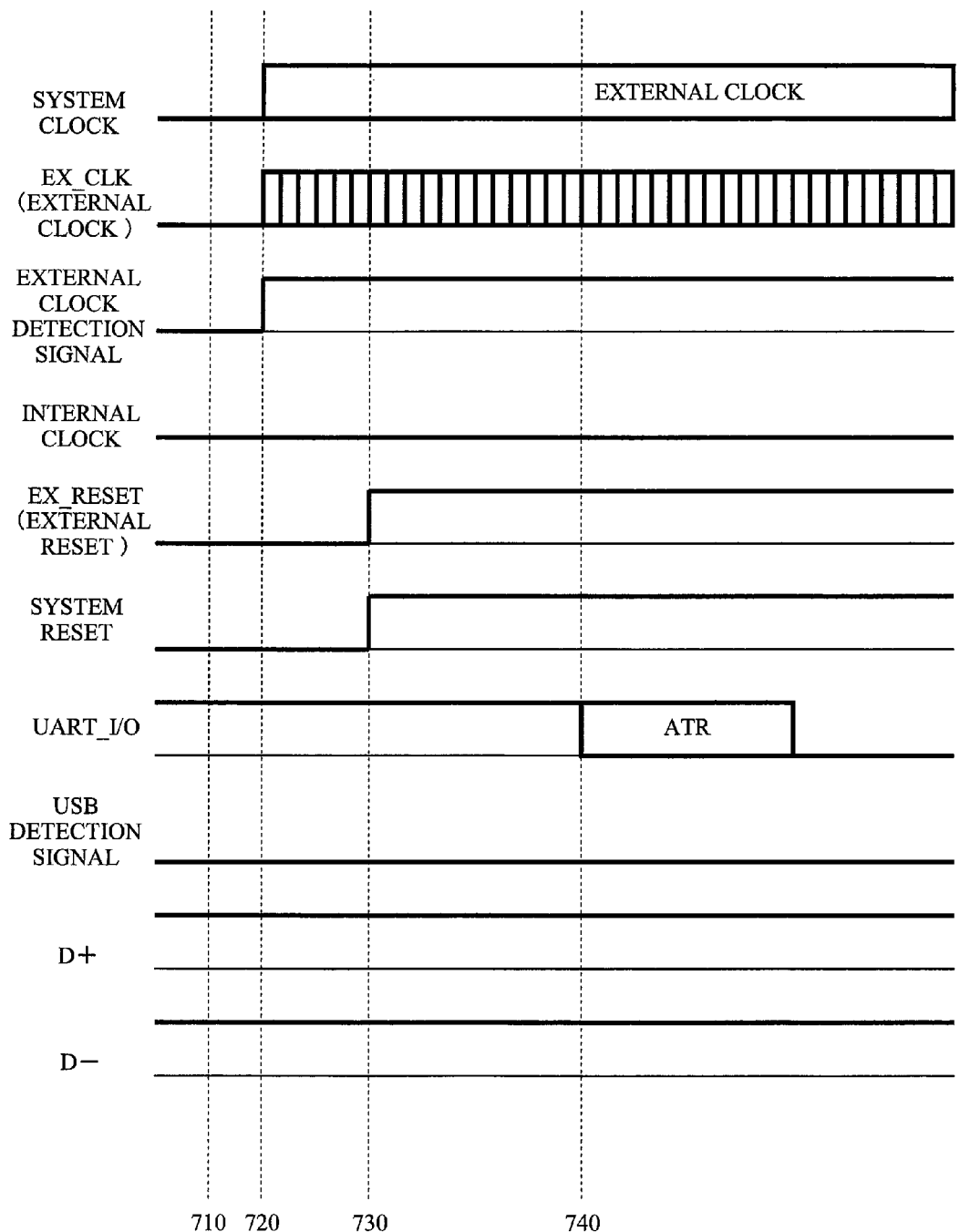
FIG. 7 is an example of a timing chart of the ISO 7816 interface activation procedure in the processing device according to the first embodiment of the present invention.

First, in FIG. 6 and FIG. 7, before a voltage is applied, EX_CLK 110 is set in a Low state, EX_RESET 111 is set in a Low state, UART_I/O 112 is set in a High state, D+ 113 is set in a High state, and D− 114 is set in a High state (timing 610, timing 710). After the voltage is applied in FIG. 5 (step 501), when the USB detection circuit 430 detects that D+ 113 and D− 114 are in a Low state for at least 10 ms (step 502), the USB interface activation procedure starts. At this time, the USB detection circuit 430 sets the USB detection signal 431 in a High state (timing 620).

The USB detection circuit 430 operates by using a clock generated by an oscillator different from the internal oscillator 120. However, in order to reduce power consumption, its operation frequency is assumed to be about several MHz. Also, this clock may be a clock generated by the internal oscillator 120. However, in this case, the internal oscillator 120 has to be activated at the time of applying a voltage.

When detecting that the USB detection signal 431 becomes a High state, the internal oscillator 120 generates the internal clock 412 (step 511, timing 620). Then, the internal oscillator 120 waits until the oscillation of the internal clock 412 is stabilized by using the timer in the internal oscillator 120, and after it is stabilized, it supplies the internal clock 412 as the system clock 413 to the CPU 141, each interface control circuit and others via the clock switching circuit 410 (step 512). At this time, the clock switching circuit 410 sets the internal clock start signal 415 in a High state (timing 630). Note that the internal clock 412 does not have to be supplied to the UART control circuit 142.

Next, after confirming that the USB detection signal 431 is in a High state and the internal clock start signal 415 is in a High state, the reset control circuit 420 sets the system reset 422 in a High state (step 513, timing 640). Note that, in place of the system reset 422, the USB reset 424 may be set in a High state.

After the system reset 422 becomes a High state, the USB control circuit 143 sets D+ 113 in a High state when the processing device 100 supports Full Speed or High Speed, and sets D− 114 in a High state when the processing device 100 supports only Low Speed (step 514, timing 650). Note that it is assumed in the following description that the processing device 100 according to the present embodiment supports High Speed.

In place of the USB control circuit 143, some dedicated hardware may set D+ 113 or D− 114 in a High state. In the case of using such dedicated hardware, since the operation is possible even without the supply of the internal clock 412, power consumption of the entire processing device 100 can be reduced. Therefore, generation and supply of the internal clock 412 (steps 511, 512) and a reset process (step 513) are desirably performed at a timing as late as possible, that is, after step 515.

Since D+ 113 becomes a High state, the external terminal device detects that the processing device 100 with a USB interface is connected, and causes D+ 113 in a High state to be set in a Low state (step 515, timing 660). Only when the above processes are normally performed, the USB interface is activated, and the processing device 100 can operate as a device for performing the data transfer with the USB interface.

If the USB detection circuit 430 does not detect in step 502 that D+ 113 and D− 114 are in a Low state for 10 ms and further the clock switching circuit 410 detects in step 521 that the external clock 411 has been supplied via EX_CLK 110, the ISO 7816 interface activation procedure starts. At this time, after confirming that the USB detection signal 431 is in a Low state, the clock switching circuit 410 supplies the external clock 411 as the system clock 413 and sets the external clock detection signal 414 in a High state (timing 720).

Next, upon detection that an external reset 421 via EX_RESET 111 becomes a High state within 400 clocks after the external clock detection signal 414 becomes a High state, the reset control circuit 420 sets the system reset 422 in a High state (step 522, timing 730). Note that, in place of the system reset 422, the UART reset 423 may be set in a High state. Also, a transition to the ISO 7816 interface activation procedure may be made by the detection that the external reset 421 becomes a High state, in place of the detection of the external clock 411.

After the system reset 422 becomes a High state, the UART control circuit 142 transmits ATR (Answer To Reset) to the external terminal device via UART_I/O 112 within 40,000 clocks (step 523, timing 740). Only when the above processes are normally performed, the ISO 7816 interface is activated, and the processing device 100 can operate as a device for performing the data transfer with the ISO 7816 interface. Note that, when the ISO 7816 interface is activated, the external clock 411 does not have to be supplied to the USB control circuit 143.

All of the processes described above can be performed by hardware by using the clock control circuit 130 as well as the UART control circuit 142 and the USB control circuit 143. In the following, however, an example of a method of activating the USB interface and the ISO 7816 interface by the use of firmware mounted in a ROM or the like incorporated in the CPU 141 will be described.

Figure 15:
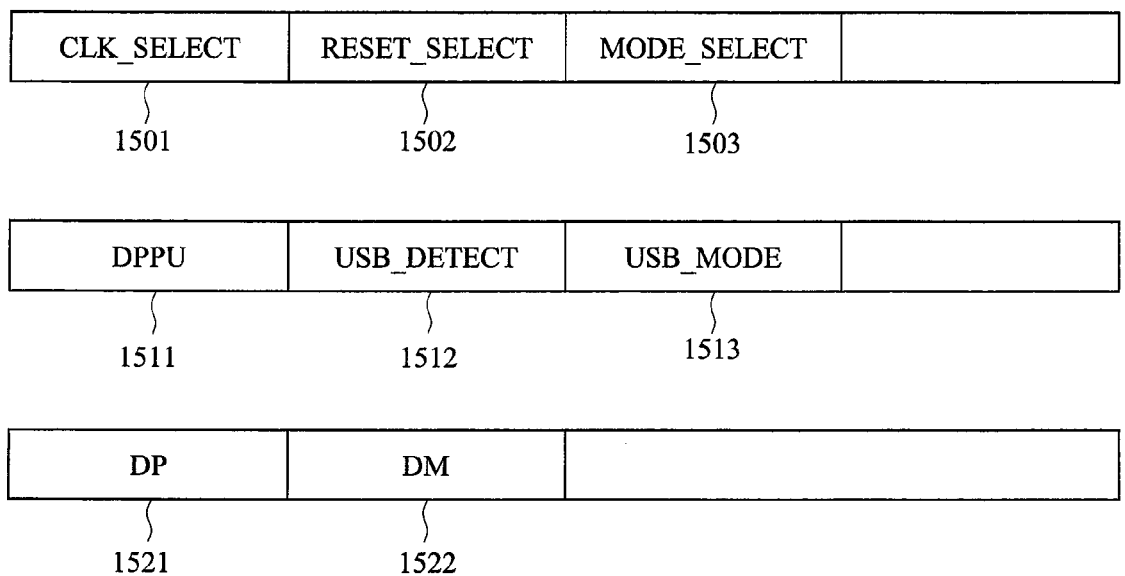
FIG. 15 is a drawing showing a part of a configuration example of a register used in activating a USB interface and an ISO 7816 interface in the processing device according to the first embodiment of the present invention.
Figure 16:
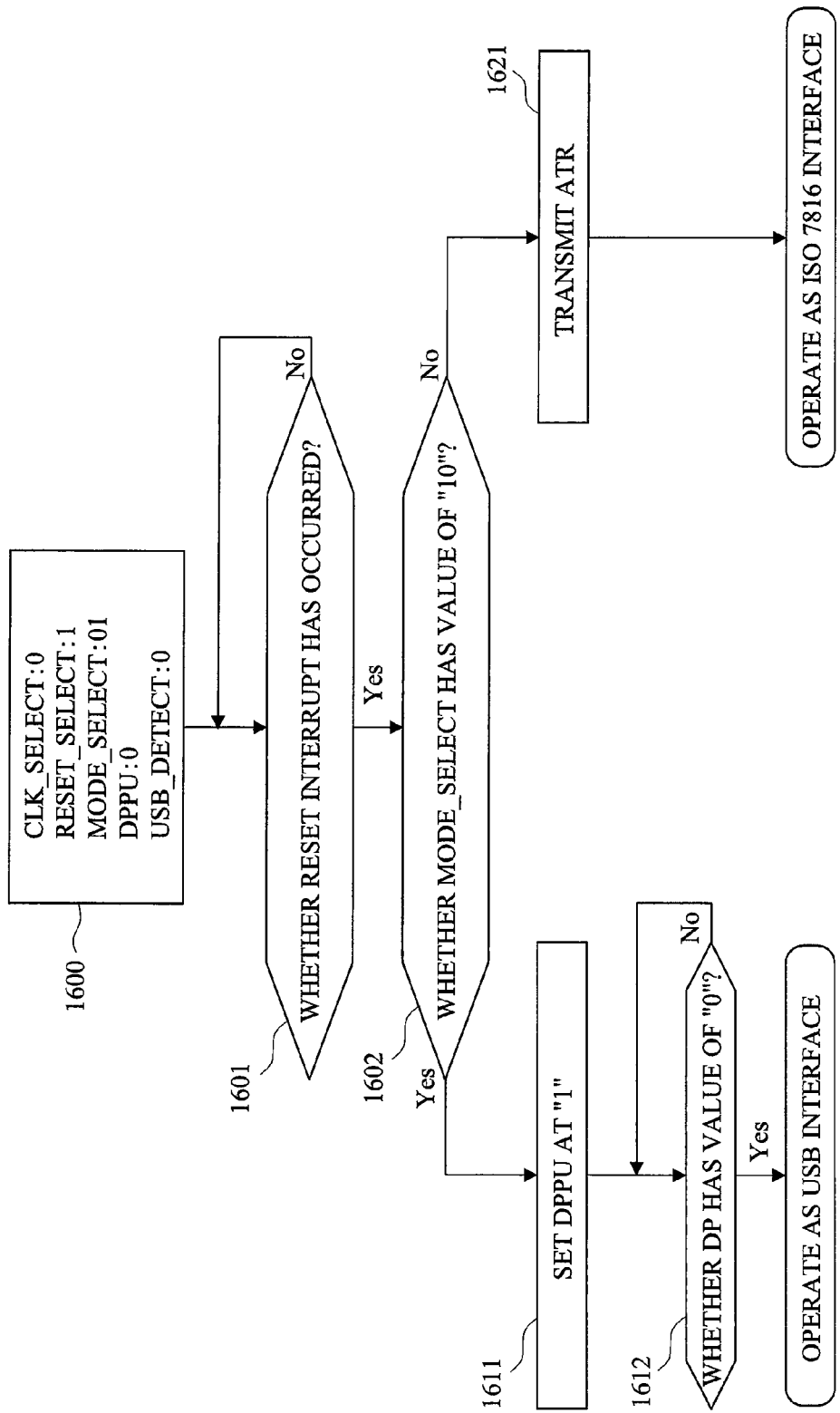
FIG. 16 is a flow diagram showing an example of a USB interface activation procedure and an ISO 7816 interface activation procedure by the use of firmware in the processing device according to the first embodiment of the present invention.

FIG. 15 is a drawing showing a part of a configuration example of a register used in activating the USB interface and the ISO 7816 interface in the processing device 100 according to the present embodiment. FIG. 16 is a flow diagram showing an example of a USB interface activation procedure and an ISO 7816 interface activation procedure by the use of the firmware in the processing device 100 according to the present embodiment.

In FIG. 15, CLK_SELECT 1501 represents a bit indicative of a supply source of the system clock 413. For example, if the bit is "0", the supply source is the external clock 411. If the bit is "1", the supply source is the internal clock 412. RESET_SELECT 1502 represents a bit indicative of validity/invalidity of the external reset 421. For example, if the bit is "0", the external reset 421 is invalid. If the bit is "1", the external reset 421 is valid. MODE_SELECT 1503 represents a bit indicative of a usable interface. For example, if the bit is "01", the ISO 7816 interface can be used. If the bit is "10", the USB interface can be used. Furthermore, if the bit is "11", both the interfaces can be used.

DPPU 1511 represents a bit for pulling up D+ 113 or D− 114 when "1" is set thereto, for example. USB_DETECT 1512 represents a bit to which "1" is set when the USB detection circuit 430 detects that D+ 113 and D− 114 are in a Low state for at least 10 ms. USB_MODE 1513 represents a bit indicative of a speed of the USB interface. For example, a bit of "0" indicates Low Speed, and a bit of "1" indicates Full Speed.

DP 1521 represents a bit indicative of the state of D+ 113. For example, when the bit is "0", D+ 113 is in a Low state, and when the bit is "1", it is in a High state. DM 1522 represents a bit indicative of the state of D− 114. For example, when the bit is "0", D− 114 is in a Low state, and when the bit is "1", it is in a High state.

In FIG. 16, before a voltage is applied, CLK_SELECT 1501 is set at "0", RESET_SELECT 1502 is set at "1", and MODE_SELECT 1503 is set at "01". Also, DPPU 1511 is set at "0", and USB_DETECT 1512 is set at "0" (step 1600). Note that USB_MODE 1513, DP 1521, and DM 1522 can be set at different values in accordance with the specifications of the processing device 100. In the processing device 100 according to the present embodiment, however, it is assumed that they are all set at "1".

After a voltage is applied, when a reset interrupt occurs in the CPU 141 (step 1601), the firmware confirms the value of MODE_SELECT 1503 in a reset interrupt function (step 1602). Note that it is assumed that the value of MODE_SELECT 1503 is set by the reset control circuit 420. When MODE_SELECT 1503 has a value of "10", the firmware sets DPPU 1511 at "1" and causes D+ 113 to be set in a High state (step 1611). Thereafter, the firmware monitors whether DP 1521 has a value of "0" (step 1612), and when the value becomes "0", the processing device 100 operates with the USB interface.

Alternatively, the USB detection circuit 430 or the USB control circuit 143 may generate an interrupt in the CPU 141 when D+ 113 becomes a Low state. Only when the above-described processes are normally performed, the USB interface is activated, and the processing device 100 can operate as a device for performing the data transfer with the USB interface.

Also, when MODE_SELECT 1503 has a value of "01" in step 1602, the firmware transmits ATR to the external terminal device in the reset interrupt function via UART_I/O 112 within 40,000 clocks (step 1621). Only when the above-described processes are normally performed, the ISO 7816 interface is activated, and the processing device 100 can operate as a device for performing the data transfer with the ISO 7816 interface.

With the above-described processes, the ISO 7816 interface and the USB interface can be activated in one processing device 100, and it is possible to handle the data transfer with a plurality of interfaces. Here, as shown in FIG. 2, an external terminal used in the data transfer with the ISO 7816 interface and an external terminal used in the data transfer with the USB interface are different from each other. Therefore, it is physically possible to use both the interfaces at the same time.

However, as a result of the process of the initial operation described above, the processing device 100 operates by the external clock 411 when operating with the ISO 7816 interface, and operates by the internal clock 412 when operating with the USB interface. For this reason, when both the interfaces are simultaneously used, the system clock 413 has to be specified to either one of the external clock 411 and the internal clock 412.

As described above, although the external clock 411 can be used even in the case of data transfer with the USB interface, the operation frequency is as slow as about 4 MHz, and therefore the external clock 411 is not suitable for the data transfer with the USB interface handling a large amount of data. Therefore, in the processing device 100 according to the present embodiment, it is assumed that the internal clock 412 is used as the system clock 413 for operation when both the interfaces are used. However, if the external clock 411 is high-speed, for example, it is also possible to use the external clock 411 as the system clock 413.

Here, in the case where the USB interface is to be activated during when the processing device 100 operates with the ISO 7816 interface, the system clock 413 has to be switched from the external clock 411 to the internal clock 412. However, if a switching from the external clock 411 to the internal clock 412 is made during the operation of the processing device 100, noise occurs at the time of switching, and there is the possibility that a malfunction occurs in the CPU 141.

For its prevention, in the processing device 100 according to the present embodiment, as shown in FIG. 4, the clock control circuit 130 includes the sleep signal 416 and the clock switching signal 417. The sleep signal 416 is a signal set in a High state when the CPU 141 makes a transition to a sleep state, and the clock switching signal 417 is a signal set in a High state when the clock switching circuit 410 switches the system clock 413 from the external clock 411 to the internal clock 412.

A method of activating the ISO 7816 interface during the operation with the USB interface and a method of activating the USB interface during the operation with the ISO 7816 interface in the processing device 100 according to the present embodiment will be described below.

Figure 8:
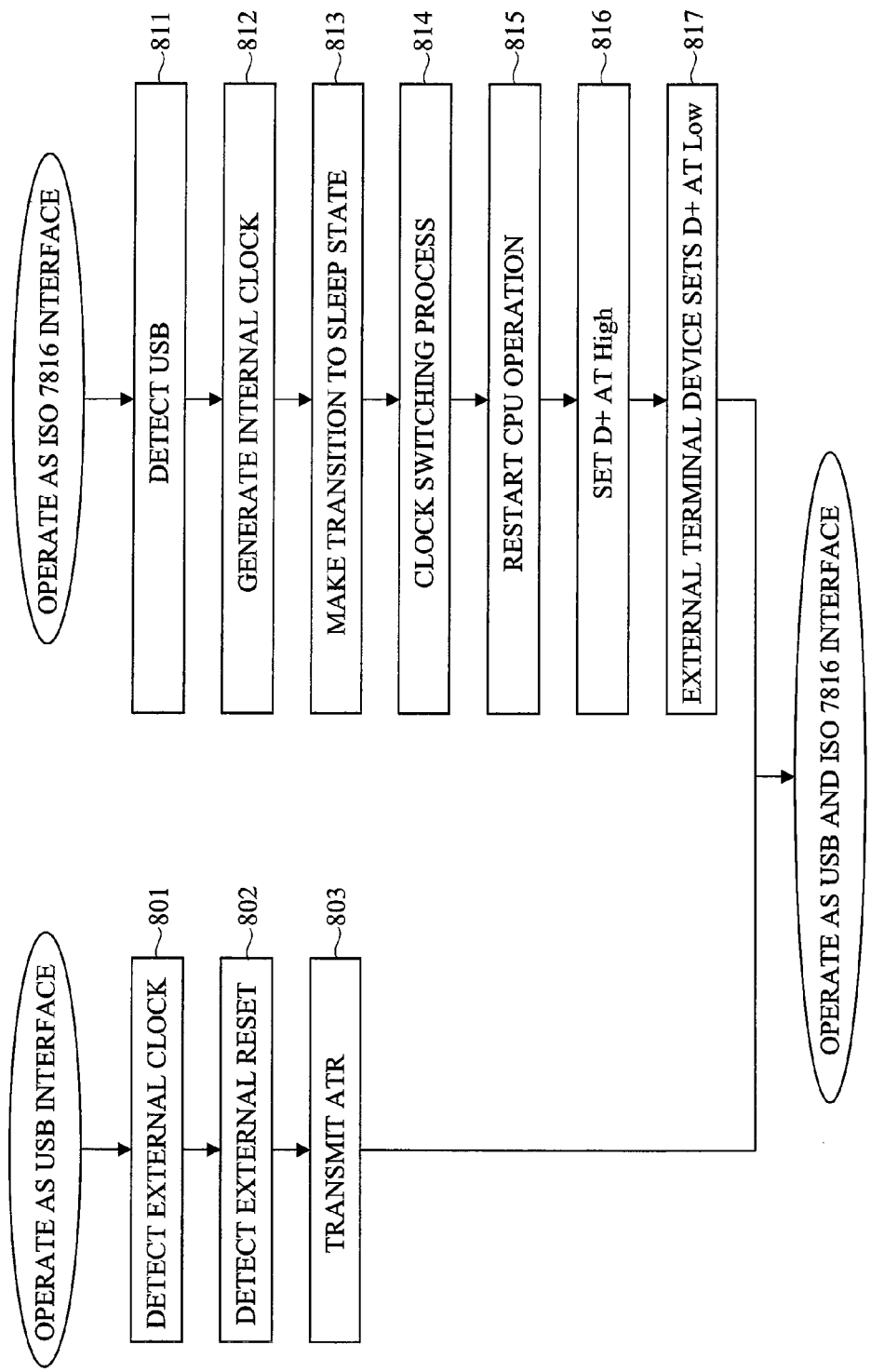
FIG. 8 is a flow diagram showing an example of an ISO 7816 interface activation procedure during the operation with a USB interface and an example of a USB interface activation procedure during the operation with an ISO 7816 interface in the processing device according to the first embodiment of the present invention.
Figure 9:
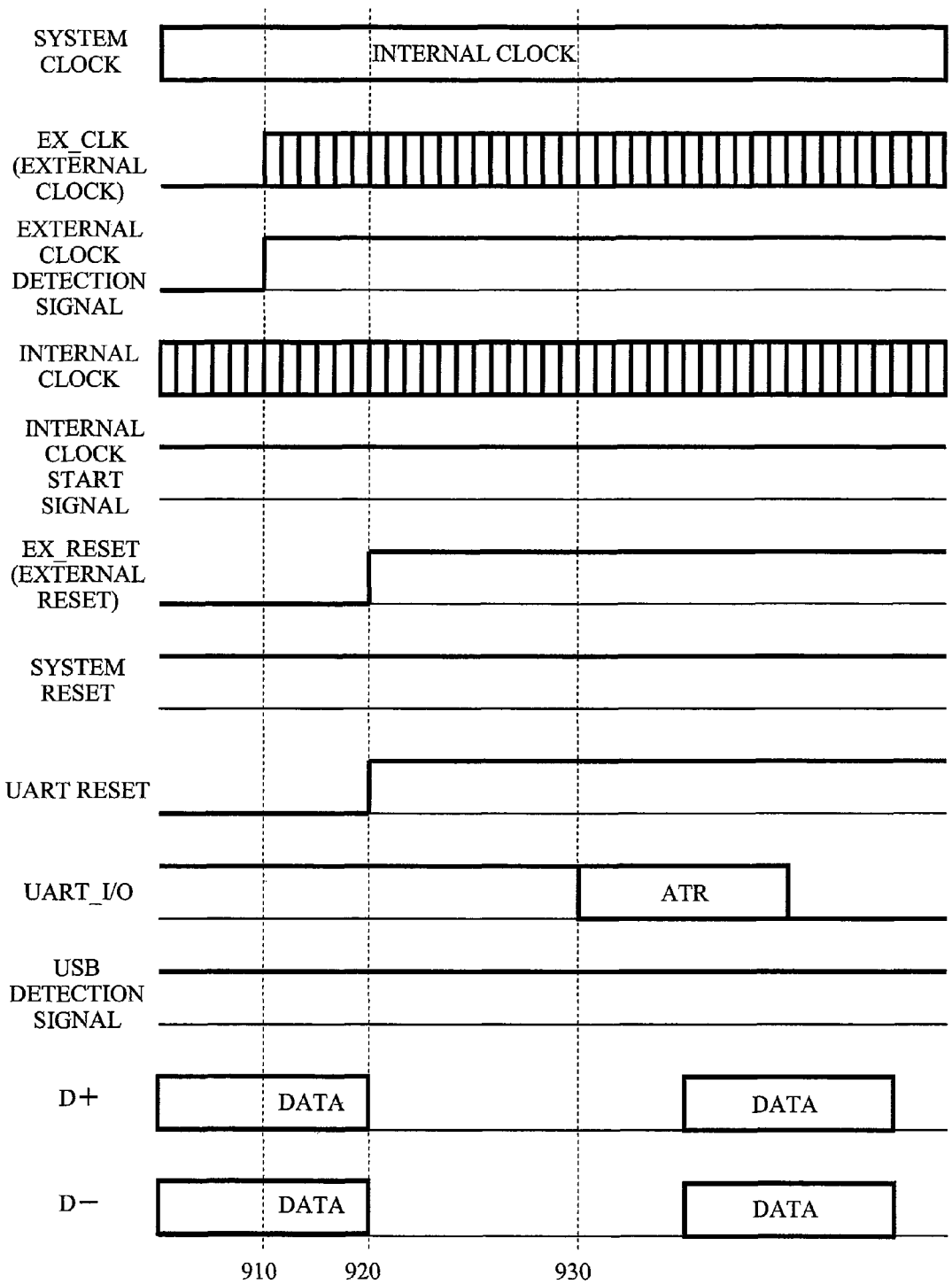
FIG. 9 is an example of a timing chart of the ISO 7816 interface activation procedure during the operation with the USB interface in the processing device according to the first embodiment of the present invention.
Figure 10:
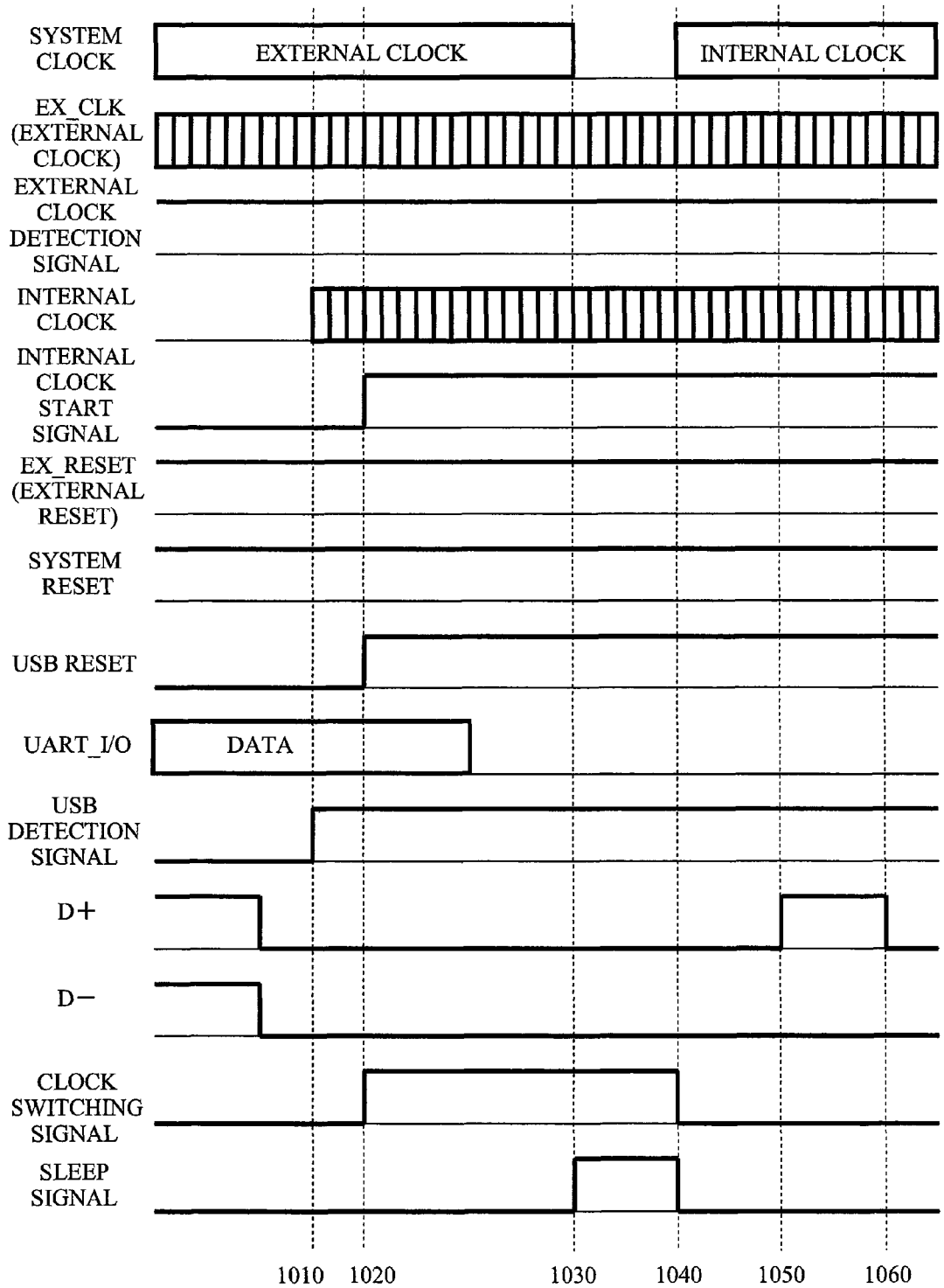
FIG. 10 is an example of a timing chart of the USB interface activation procedure during the operation with the ISO 7816 interface in the processing device according to the first embodiment of the present invention.

FIG. 8 is a flow diagram showing an example of an ISO 7816 interface activation procedure during the operation with the USB interface and an example of a USB interface activation procedure during the operation with the ISO 7816 interface in the processing device 100 according to the present embodiment. Also, FIG. 9 is an example of a timing chart of the ISO 7816 interface activation procedure during the operation with the USB interface in the processing device 100 according to the present embodiment. Further, FIG. 10 is an example of a timing chart of the USB interface activation procedure during the operation with the ISO 7816 interface in the processing device 100 according to the present embodiment.

First, when the processing device 100 is operating with the USB interface, if the clock switching circuit 410 detects that the external clock 411 has been supplied via EX_CLK 110 (step 801), the ISO 7816 interface activation procedure starts. At this time, the clock switching circuit 410 sets the external clock detection signal 414 in a High state (timing 910).

At this time, the clock switching circuit 410 supplies the internal clock 412 to the UART control circuit 142. However, since the UART control circuit 142 includes modules for performing the data transfer with an external terminal device via UART_I/O 112 and these modules have to operate with the external clock 411, the clock switching circuit 410 supplies the external clock 411 only to these modules.

Upon detection that the external reset 421 via EX_RESET 111 becomes a High state within 400 clocks after the external clock detection signal 414 becomes a High state (step 802), the reset control circuit 420 sets the UART reset 423 in a High state (timing 920). After the UART reset 423 becomes a High state, the UART control circuit 142 transmits ATR to the external terminal device via UART_I/O 112 within 40,000 clocks (step 803, timing 930). Note that the system reset 422 may be set in a High state in place of the UART reset 423.

Only when the above-described processes are normally performed, the ISO 7816 interface is activated during the operation with the USB interface, and the processing device 100 can operate with simultaneously using both the USB interface and the ISO 7816 interface.

When the processing device 100 is operating with the ISO 7816 interface, if the USB detection circuit 430 detects that D+ 113 and D− 114 are in a Low state for at least 10 ms (step 811), the USB interface activation procedure starts. At this time, the USB detection circuit 430 sets the USB detection signal 431 in a High state (timing 1010).

Upon detection that the USB detection signal 431 becomes a High state, the internal oscillator 120 generates the internal clock 412 (step 812, timing 1010). The clock switching circuit 410 sets the internal clock start signal 415 in a High state after the internal clock 412 is stabilized, and after confirming that both the external clock 411 and the internal clock 412 have been supplied, it sets the clock switching signal 417 in a High state (timing 1020). Also, upon detection that the internal clock start signal 415 becomes a High state, the reset control circuit 420 sets the USB reset 424 in a High state (timing 1020). Note that the timing of setting the USB reset 424 in a High state may be after a timing 1040 described later.

Upon detection that the clock switching signal 417 becomes a High state, the CPU 141 performs a process required to make a transition to a sleep state (setting of register, storing of current state and others) and a reset process regarding a process of the USB interface. After the required process is completed, the sleep signal 416 is set in a High state, and then a transition to a sleep state is made (step 813, timing 1030).

Upon detection that the sleep signal 416 becomes a High state, the clock switching circuit 410 switches the system clock 413 from the external clock 411 to the internal clock 412 (step 814, timing 1040). After the system clock 413 is switched, an interrupt signal is transmitted to the CPU 141 to restart the operation of the CPU 141 (step 815). At this time, the clock switching circuit 410 sets the clock switching signal 417 and the sleep signal 416 in a Low state (timing 1040).

After the restart of the operation of the CPU 141, the USB control circuit 143 sets D+ 113 in a High state (step 816, timing 1050). Note that, in place of the USB control circuit 143, dedicated hardware may set D+ 113 in a High state. Also, when the timing to set the USB reset 424 in a High state is not at the timing 1020 but at a timing after the timing 1040, the USB control circuit 143 may set D+ 113 in a High state after the USB reset 424 becomes a High state. Since D+ 113 is set in a High state, the external terminal device detects that the processing device 100 having the USB interface has been connected, and it sets the D+ 113, which has been set in a High state, in a Low state (step 817, timing 1060).

Only when the above-described processes are normally performed, the USB interface is activated during the operation with the ISO 7816 interface, and the processing device 100 can operate with simultaneously using both the USB interface and the ISO 7816 interface.

Note that, in the processing device 100 according to the present embodiment, when both the interfaces are simultaneously used, the internal clock 412 is used as the system clock 413. When the external clock 411 is used as the system clock 413, however, the above-described series of processes including the transition of the CPU 141 to a sleep state, the clock switching process, and the restart of the operation of the CPU 141 (steps 813 to 815) will be performed in the process of activating the ISO 7816 interface during the operation with the USB interface.

All of the processes described above can be performed by hardware by using the clock control circuit 130 as well as the UART control circuit 142 and the USB control circuit 143. In the following, however, an example of a method of activating the ISO 7816 interface during an operation with the USB interface and a method of activating the USB interface during an operation with the ISO 7816 interface by the use of firmware mounted in a ROM or the like incorporated in the CPU 141 will be described.

Figure 17:
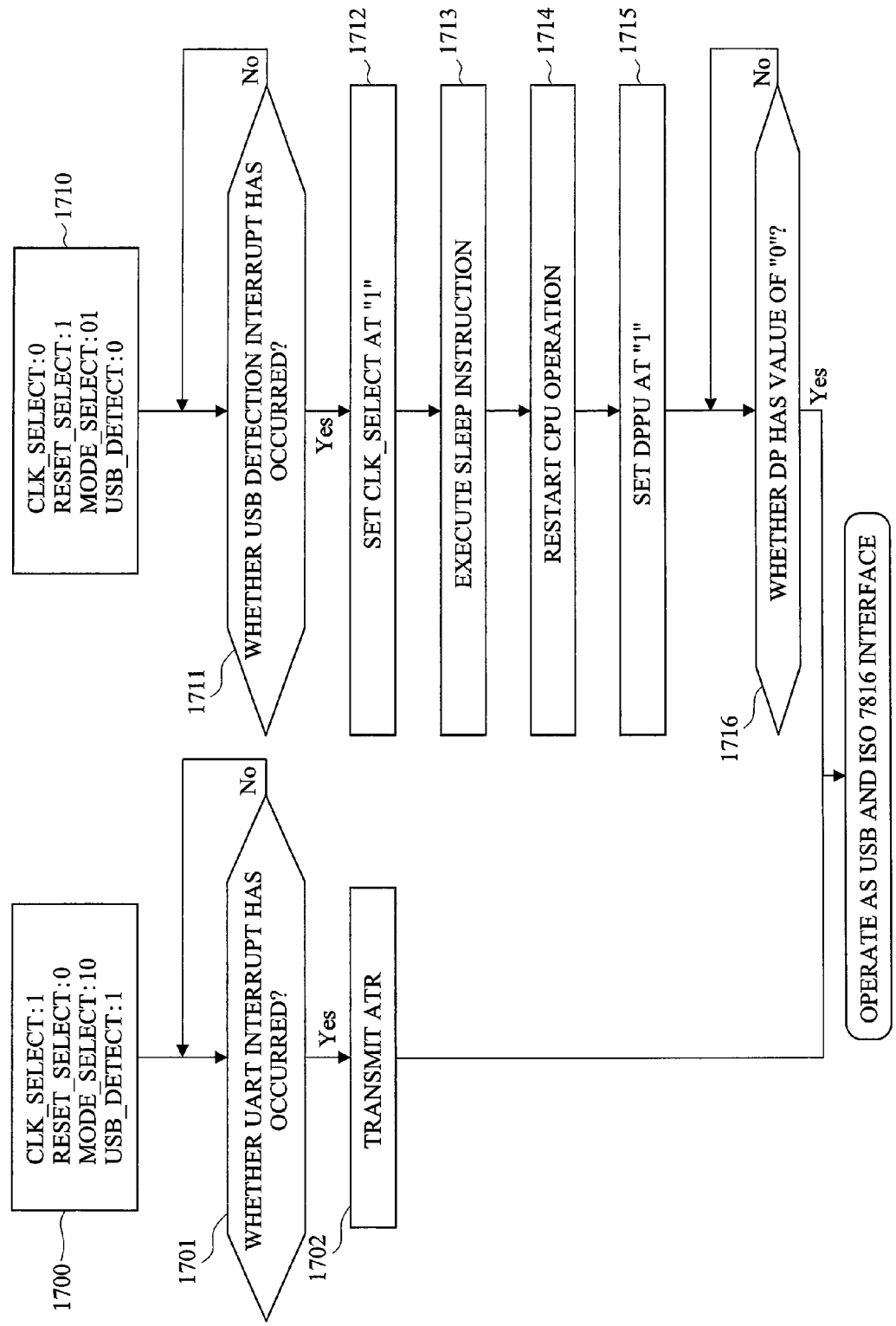
FIG. 17 is a flow diagram showing an example of an ISO 7816 interface activation procedure during the operation with the USB interface and an example of a USB interface activation procedure during the operation with the ISO 7816 interface by the use of firmware in the processing device according to the first embodiment of the present invention.

FIG. 17 is a flow diagram showing an example of an ISO 7816 interface activation procedure during the operation with the USB interface and an example of a USB interface activation procedure during the operation with the ISO 7816 interface by the use of firmware in the processing device 100 according to the present embodiment.

In FIG. 17, when the processing device 100 is operating with the USB interface, CLK_SELECT 1501 is set at "1", RESET_SELECT 1502 is set at "0", MODE_SELECT 1503 is set at "10", and USB_DETECT 1512 is set at "1" (step 1700).

Upon detection that the ISO 7816 interface activation procedure starts and the external reset 421 becomes a High state, the clock control circuit 130 or the UART control circuit 142 generates a UART interrupt to the CPU 141 (step 1701). At this time, the clock control circuit 130 sets MODE_SELECT 1503 at "11". Upon detection of the UART interrupt, the firmware transmits ART in a UART interrupt function via UART_I/O 112 within 40,000 clocks (step 1702). Note that MODE_SELECT 1503 may be set at "11" after ATR transmission.

Only when the processes as described above are normally performed, the ISO 7816 interface is activated during the operation with the USB interface, and the processing device 100 can operate with simultaneously using both the USB interface and the ISO 7816 interface.

When the processing device 100 is operating with the ISO 7816 interface, CLK_SELECT 1501 is set at "0", RESET_SELECT 1502 is set at "1", MODE_SELECT 1503 is set at "01", and USB_DETECT 1512 is set at "0" (step 1710).

Upon detection that D+ 113 and D− 114 are in a Low state for at least 10 ms, the USB detection circuit 430 or the USB control circuit 143 generates a USB detection interrupt to the CPU 141 (step 1711). Upon detection of the USB detection interrupt, the firmware sets CLK_SELECT 1501 at "1" in a USB detection interrupt function (step 1712), and executes a sleep instruction to cause the CPU 141 to make a transition to a sleep state (step 1713). Note that, since USB_DETECT 1512 is set at "1" when the USB detection signal 432 is set in a High state, the method of monitoring whether USB_DETECT 1512 becomes "1" by the firmware without using a USB detection interrupt may also be possible.

When the sleep instruction is executed, the sleep signal 416 becomes a High state. Therefore, the clock switching circuit 410 switches the system clock 413 to the internal clock 412, and transmits an interrupt signal to the CPU 141 to restart the operation of the CPU 141 (step 1714). After the restart of the operation of the CPU 141, the firmware sets DPPU 1511 at "1" to cause D+ 113 to be set in a High state (step 1715). Thereafter, the firmware monitors whether DP 1521 has a value of "0" (step 1716). When the value becomes "0", the operation is made with the USB interface. Note that it is also possible to generate an interrupt again to the CPU 141 when D+ 113 becomes a Low state.

Only when the above-described processes are normally performed, the USB interface is activated during the operation with the ISO 7816 interface, and the processing device 100 can operate with simultaneously using both the USB interface and the ISO 7816 interface.

Since the operation of the CPU 141 stops during the transition to a sleep state, by setting the CPU 141 in a sleep state in the switching of the system of the clock to be supplied as the system clock 413 as described above, the clock system can be switched without being influenced by noise. Furthermore, even when the clock is attacked from outside during switching of the clock system, since the operation of the CPU 141 stops, there is no possibility of a malfunction of the CPU 141, and the tamper-resistant property of the processing device 100 can be maintained.

Next, a method of deactivating the ISO 7816 interface during an operation with both interfaces and a method of deactivating the USB interface during an operation with both interfaces in the processing device 100 according to the present embodiment will be described.

Figure 11:
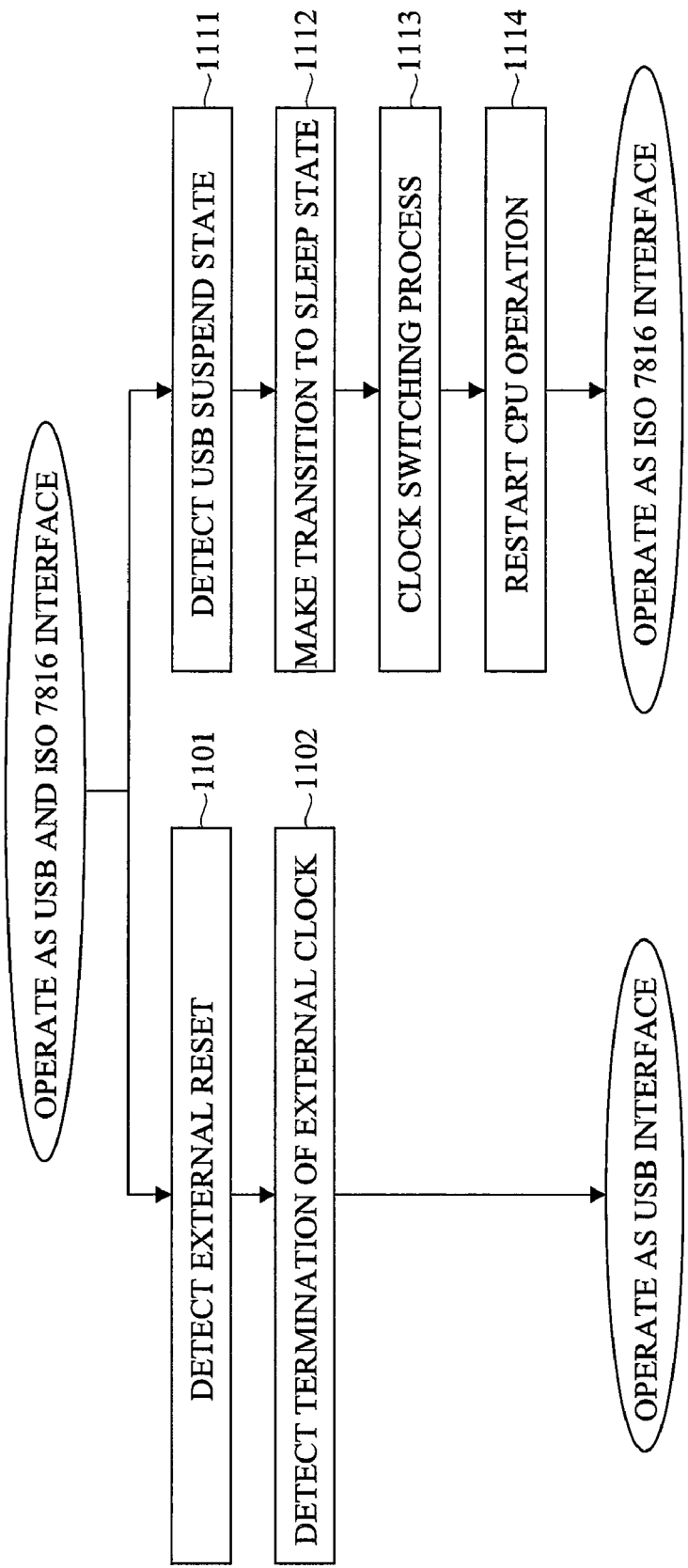
FIG. 11 is a flow diagram showing an example of an ISO 7816 interface deactivation procedure during an operation with both interfaces and an example of a USB interface deactivation procedure during an operation with both interfaces in the processing device according to the first embodiment of the present invention.
Figure 12:
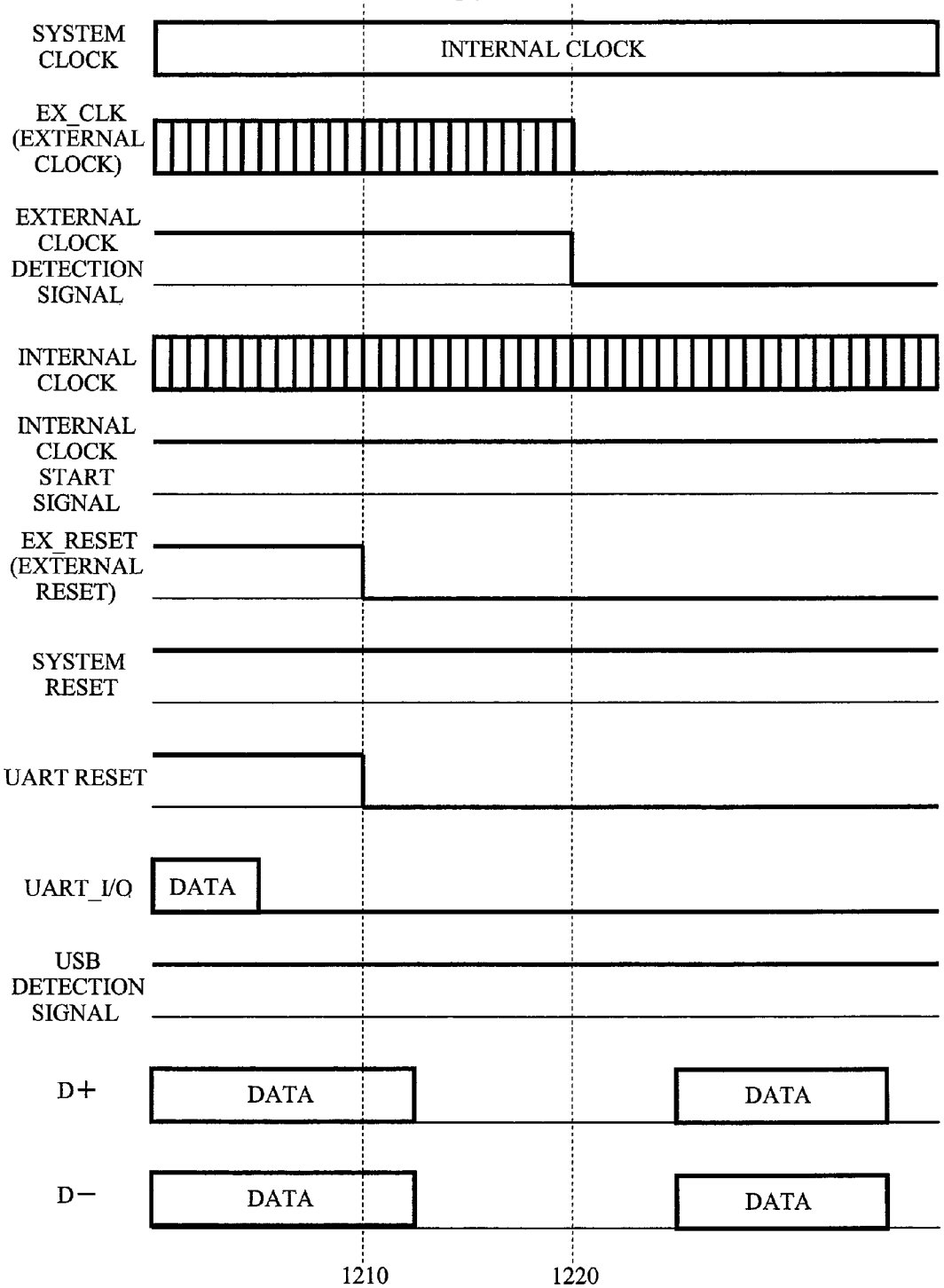
FIG. 12 is an example of a timing chart of the ISO 7816 interface deactivation procedure during the operation with both interfaces in the processing device according to the first embodiment of the present invention.
Figure 13:
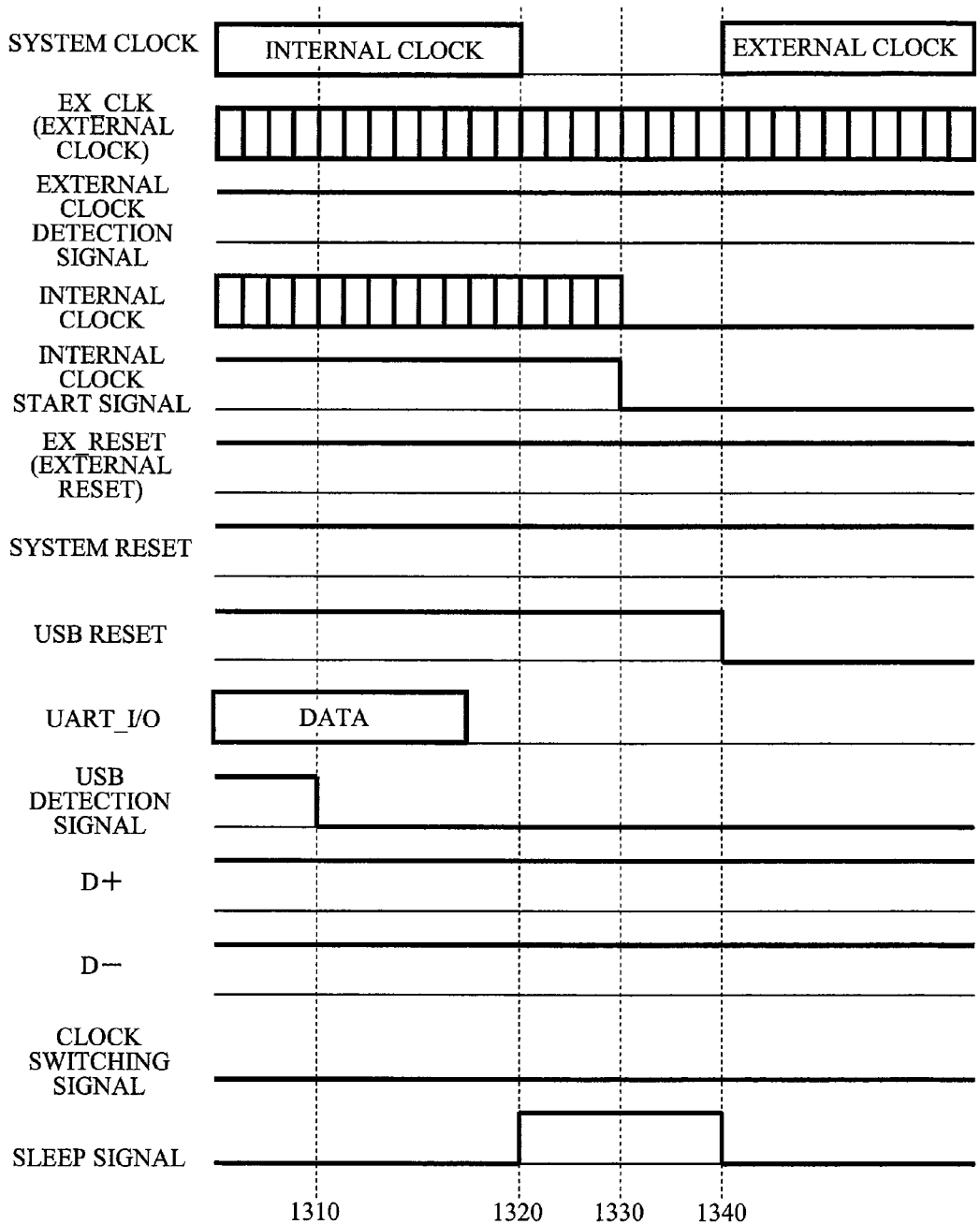
FIG. 13 is an example of a timing chart of the USB interface deactivation procedure during the operation with both interfaces in the processing device according to the first embodiment of the present invention.

FIG. 11 is a flow diagram showing an example of an ISO 7816 interface deactivation procedure during an operation with both interfaces and an example of a USB interface deactivation procedure during an operation with both interfaces in the processing device 100 according to the present embodiment. Also, FIG. 12 is an example of a timing chart of the ISO 7816 interface deactivation procedure during the operation with both interfaces in the processing device 100 according to the present embodiment. Further, FIG. 13 is an example of a timing chart of the USB interface deactivation procedure during the operation with both interfaces in the processing device 100 according to the present embodiment.

First, when the processing device 100 is operating with both interfaces, if the reset control circuit 420 detects that the external reset 421 via EX_RESET 111 becomes a Low state (step 1101), the ISO 7816 interface deactivation procedure starts. At this time, the reset control circuit 420 sets the UART reset 423 in a Low state (timing 1210). After the detection that the external reset 421 becomes a Low state, the clock switching circuit 410 detects that the supply of the external clock 411 via EX_CLK 110 has been terminated (step 1102). At this time, the external clock detection signal 414 is set in a Low state (timing 1220).

When the above-described processes are normally performed, the ISO 7816 is deactivated, and the processing device 100 operates only with the USB interface. Thereafter, when the clock control circuit 130 detects the supply of the external clock 411, the ISO 7816 interface can be activated again. Note that, even when the external terminal device terminates the supply of the external clock 411 without setting the external reset 421 in a Low state, although this is against the ISO 7816 standards, the ISO 7816 interface can be deactivated and the processing device 100 may operate only with the USB interface.

When the processing device 100 is operating with both interfaces, if the USB detection circuit 430 detects that the state of the signal lines of D+ 113 and D− 114 becomes in a suspend state (step 1111), the USB interface deactivation procedure starts. At this time, the USB detection circuit 430 sets the USB detection signal 431 in a Low state (timing 1310). The suspend state is a state in which no data is transferred with the external terminal device for 3 ms or longer and the processing device 100 is operated in a power-saving mode in order to reduce power consumption. Note that, in place of the USB detection circuit 430, the USB control circuit 143 or dedicated hardware may detect the suspend state.

Upon detection that the USB detection signal 431 becomes a Low state, the CPU 141 performs a process required to make a transition to a sleep state (setting of register, storing of current state and others). After the required process is completed, the sleep signal 416 is set in a High state, and a transition to a sleep state is made (step 1112, timing 1320). Upon detection that the sleep signal 416 becomes a High state, the clock switching circuit 410 switches the system clock 413 from the internal clock 412 to the external clock 411 (step 1113, timing 1330). At this time, the internal clock 412 may be terminated. Note that it is also possible to terminate the internal clock 412 by setting the internal clock start signal 415 in a Low state (timing 1330).

After the switching of the system clock 413, an interrupt signal is transmitted to the CPU 141, and the operation of the CPU 141 is restarted with the external clock 411 (step 1114, timing 1340). Note that, even when it is detected in step 1111 that the USB interface becomes a suspend state, unlike the above, the system clock 413 may not be switched from the internal clock 412 to the external clock 411 and the operation may be continued as it is with the internal clock 412.

When the above-described processes are normally performed, the USB interface is deactivated, and the processing device 100 operates only with the ISO 7816 interface. Thereafter, when the USB detection circuit 430 or the CPU 141 detects that the state of the signal lines of D+ 113 and D− 114 becomes a resume state, the ISO 7816 interface can be activated again.

All of the processes described above can be performed by hardware by using the clock control circuit 130 as well as the UART control circuit 142 and the USB control circuit 143. In the following, however, an example of a method of deactivating the ISO 7816 interface during an operation with both interfaces and a method of deactivating the USB interface during an operation with both interfaces by the use of firmware mounted in a ROM or the like incorporated in the CPU 141 will be described.

Figure 18:
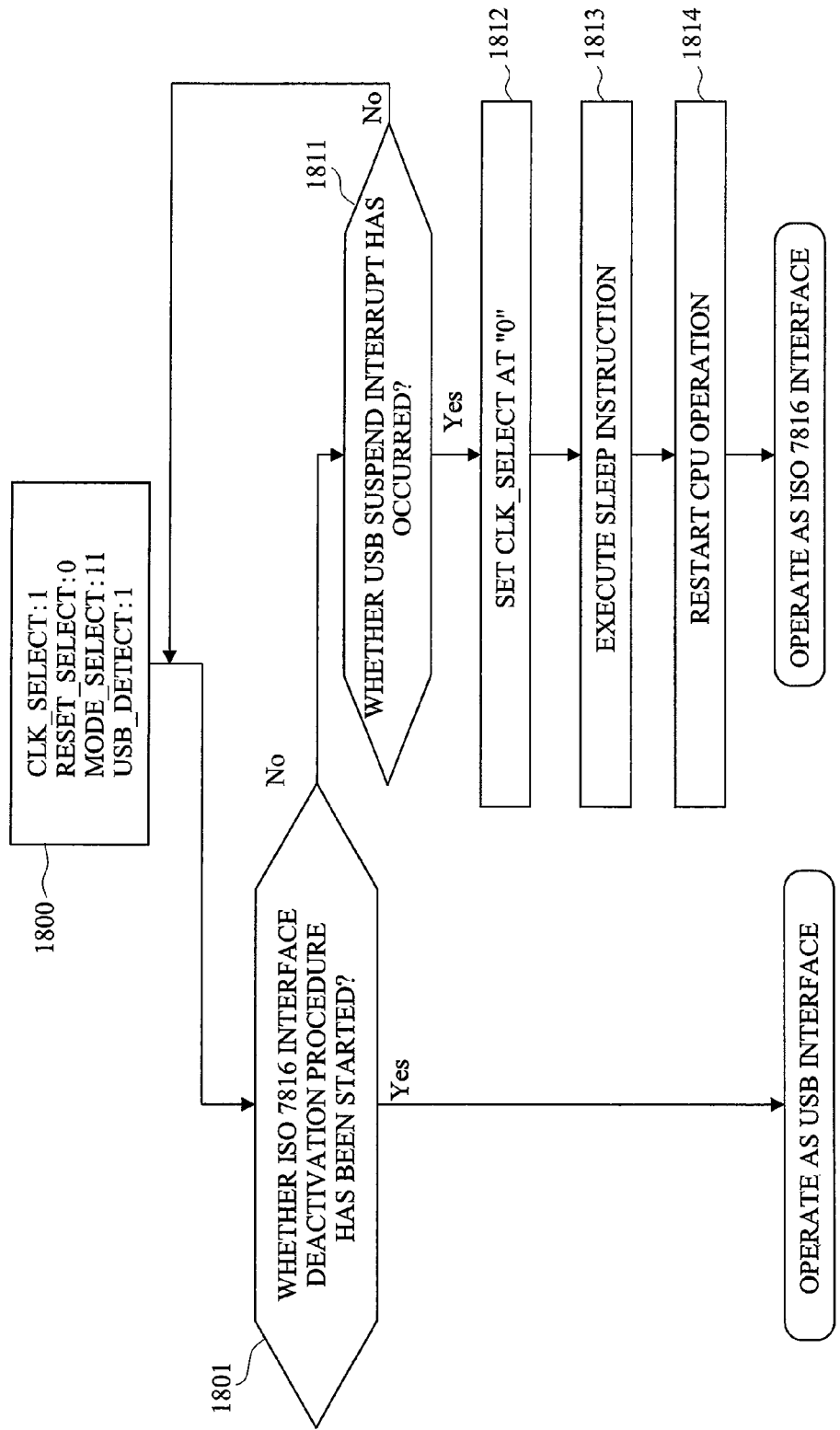
FIG. 18 is a flow diagram showing an example of an ISO 7816 interface deactivation procedure during the operation with both interfaces and an example of a USB interface deactivation procedure during the operation with both interfaces by the use of firmware in the processing device according to the first embodiment of the present invention.

FIG. 18 is a flow diagram showing an example of an ISO 7816 interface deactivation procedure during an operation with both interfaces and an example of a USB interface deactivation procedure during an operation with both interfaces by the use of firmware in the processing device 100 according to the present embodiment.

In FIG. 18, when the processing device 100 is operating with both interfaces, CLK_SELECT 1501 is set at "1", RESET_SELECT 1502 is set at "0", MODE_SELECT 1503 is set at "11", and USB_DETECT 1512 is set at "1" (step 1800).

When the processing device 100 is operating with both interfaces, if the ISO 7816 interface deactivation procedure starts (step 1801), the firmware does not have to perform a special process. Therefore, when the ISO 7816 interface deactivation procedure in the clock control circuit 130 is completed, the processing device 100 operates only with the USB interface. Note that the clock control circuit 130 or the UART control circuit 142 may generate an interrupt informing the CPU 141 that the supply of the external clock 411 via EX_CLK 110 has been terminated.

When the processing device 100 is operating with both interfaces, if the USB detection circuit 430 or the USB control circuit 143 detects that the state of the signal lines of D+ 113 and D− 114 becomes a suspend state, a USB suspend interrupt is generated to the CPU 141 (step 1811). At this time, the firmware sets CLK_SELECT 1501 at "0" in a USB suspend interrupt function (step S1812), and executes a sleep instruction to cause the CPU 141 to make a transition to a sleep state (step 1813). Note that the suspend state may be detected by using a register in which "1" is set when the state of the signal lines of D+ 113 and D− 114 becomes a suspend state.

When the sleep instruction is executed, the sleep signal 416 becomes a High state. Therefore, the clock switching circuit 410 switches the system clock 413 to the external clock 411, and transmits an interrupt signal to the CPU 141 to restart the operation of the CPU 141 (step 1814). When the above-described processes are normally performed, the USB interface is deactivated, and the processing device 100 operates only with the ISO 7816 interface.

As described above, in the processing device 100 according to the present embodiment, even when a plurality of interfaces for data transfer are provided, the system clock 413 can be switched between the external clock 411 and the internal clock 412 in accordance with the state of the interfaces. Also, switching can be made through a procedure in which a malfunction of the CPU 141 due to noise at the time of clock switching does not occur.

Accordingly, in the processing device 100 having an external terminal complying with ISO 7816-2, both an interface for data transfer complying with ISO 7816-3 and an interface for USB transfer complying with ISO 7816-12 can be simultaneously used. When a small amount of data is transferred in compliance with ISO 7816-3, the external clock 411 with low power consumption can be used for operation, and when a large amount of data is transferred in compliance with ISO 7816-12, the internal clock 412 with high power consumption can be used for operation.

Second Embodiment

Figure 14:
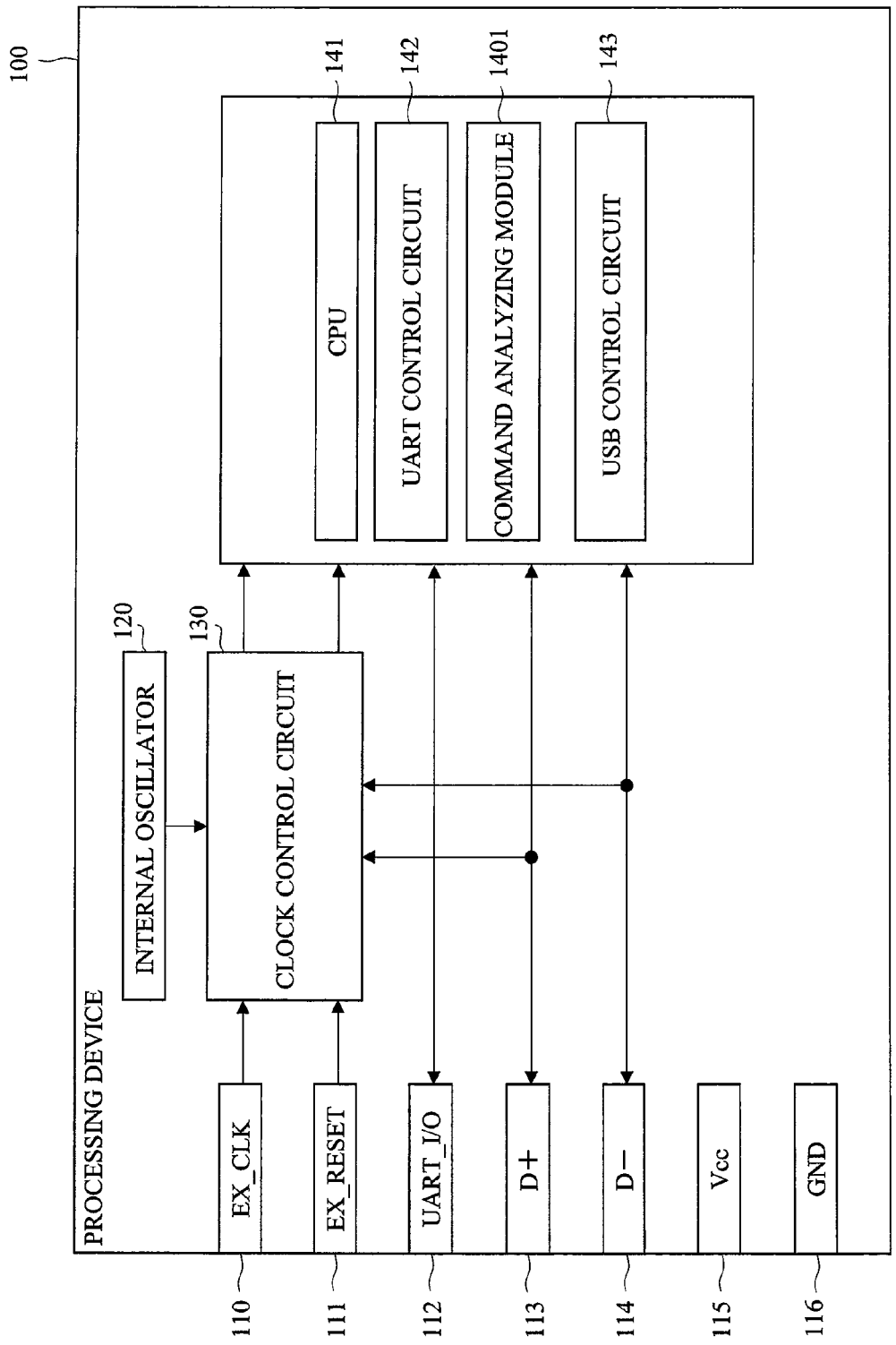
FIG. 14 is a drawing showing an example of the internal configuration of a processing device according to a second embodiment of the present invention.

A processing device according to a second embodiment of the present invention will be described. FIG. 14 is a drawing showing an example of the internal configuration of the processing device 100 according to the present embodiment, in which a command analyzing module 1401 is added to the configuration of the processing device 100 shown in FIG. 1.

After the processing device 100 activates the ISO 7816 interface through the processes of steps 521 to 523 of FIG. 5 in the first embodiment, when an external terminal device inputs a specific command to the processing device 100 via the UART_I/O 112, the command analyzing module 1401 analyzes the command to cause the CPU 141 to make a transition to a sleep state.

Then, similar to steps 814 and 815 of FIG. 8 in the first embodiment, after the system clock 413 is switched from the external clock 411 to the internal clock 412, the operation of the CPU 141 is started. Further, the switching from the internal clock 412 to the external clock 411 can be performed by using a specific command via UART_I/O 112 in the same manner.

Alternatively, without using the command analyzing module 1401, the command may be analyzed by the use of firmware mounted in a ROM or the like incorporated in the CPU 141, and similar to steps 1712 to 1714 of FIG. 17 in the first embodiment, the system clock 413 is switched from the external clock 411 to the internal clock 412, and then, the operation of the CPU 141 may be started. Furthermore, switching from the internal clock 412 to the external clock 411 can be performed in the same manner.

After the system clock 413 is switched from the external clock 411 to the internal clock 412 through the procedure described above, when it is detected that D+ 113 and D− 144 are in a Low state for at least 10 ms, after the USB interface activation procedure is performed, the operation may be performed with simultaneously using the USB interface and the ISO 7816 interface. Note that, in the processing device 100 according to the present embodiment, since the system clock 413 is switched by an input of a command using the ISO 7816-interface, the configuration in which a module and a terminal required for data transfer with the USB interface are not present may also be possible.

As described above, in the processing device 100 according to the present embodiment, the system clock 413 can be switched between the external clock 411 and the internal clock 412 by a command from outside. Also, switching can be made through a procedure in which a malfunction of the CPU 141 due to noise at the time of clock switching does not occur.

Third Embodiment

Figure 19:
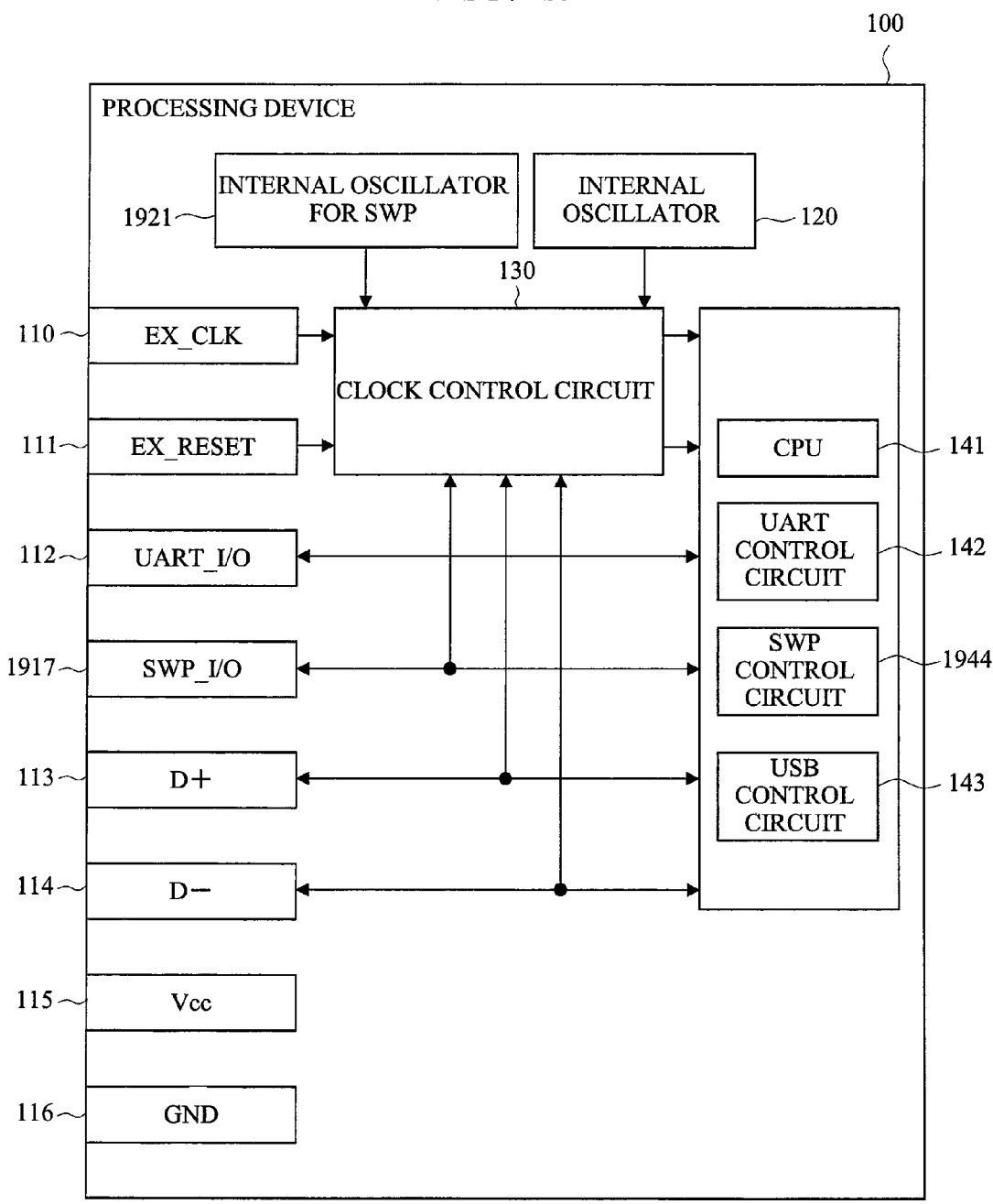
FIG. 19 is a drawing showing an example of the internal configuration of a processing device according to a third embodiment of the present invention.

A processing device according to a third embodiment of the present invention will be described with reference to FIG. 19 to FIG. 30. FIG. 19 is a drawing showing an example of the internal configuration of the processing device 100 according to the present embodiment, in which SWP_I/O 1917, an internal oscillator for SWP 1921, and an SWP control circuit 1944 are added to the configuration of the processing device 100 shown in FIG. 1.

SWP_I/O 1917 is an external interface for performing data transfer complying with SWP (Single Wire Protocol) between an external terminal device and the processing device 100, and the C6 terminal 206 in FIG. 2 is assigned thereto in ETSI (European Telecommunications Standards Institute) standards. The SWP control circuit 1944 is a circuit achieving data transfer complying with SWP. Hereinafter, an interface for performing data transfer complying with SWP is referred to as an SWP interface. In the data transfer with the SWP interface, for example, data transfer is generally performed through non-contact communication with an external terminal device having an RF circuit.

Although an external clock can be used even for the data transfer with the SWP interface, there is no guarantee that an external clock will be continuously supplied from an external terminal device during the process with the SWP interface. Also, although the internal clock generated by the internal oscillator 120 used in a process with the USB interface can be used, the SWP interface does not handle a large amount of data, and furthermore, power consumption has to be reduced as much as possible. Therefore, the internal clock used in a process with the USB interface is not suitable.

Therefore, in the processing device 100 according to the present embodiment, the internal oscillator for SWP 1921 is provided as a clock generation circuit, and a clock generated by the internal oscillator for SWP 1921 is used at the time of a process with the SWP interface. Note that the internal oscillator for SWP 1921 is not restricted to that provided inside the processing device 100 and may be that connected from outside the processing device 100. Hereinafter, a clock generated by the internal oscillator for SWP 1921 is referred to as an internal clock for SWP.

Figure 20:
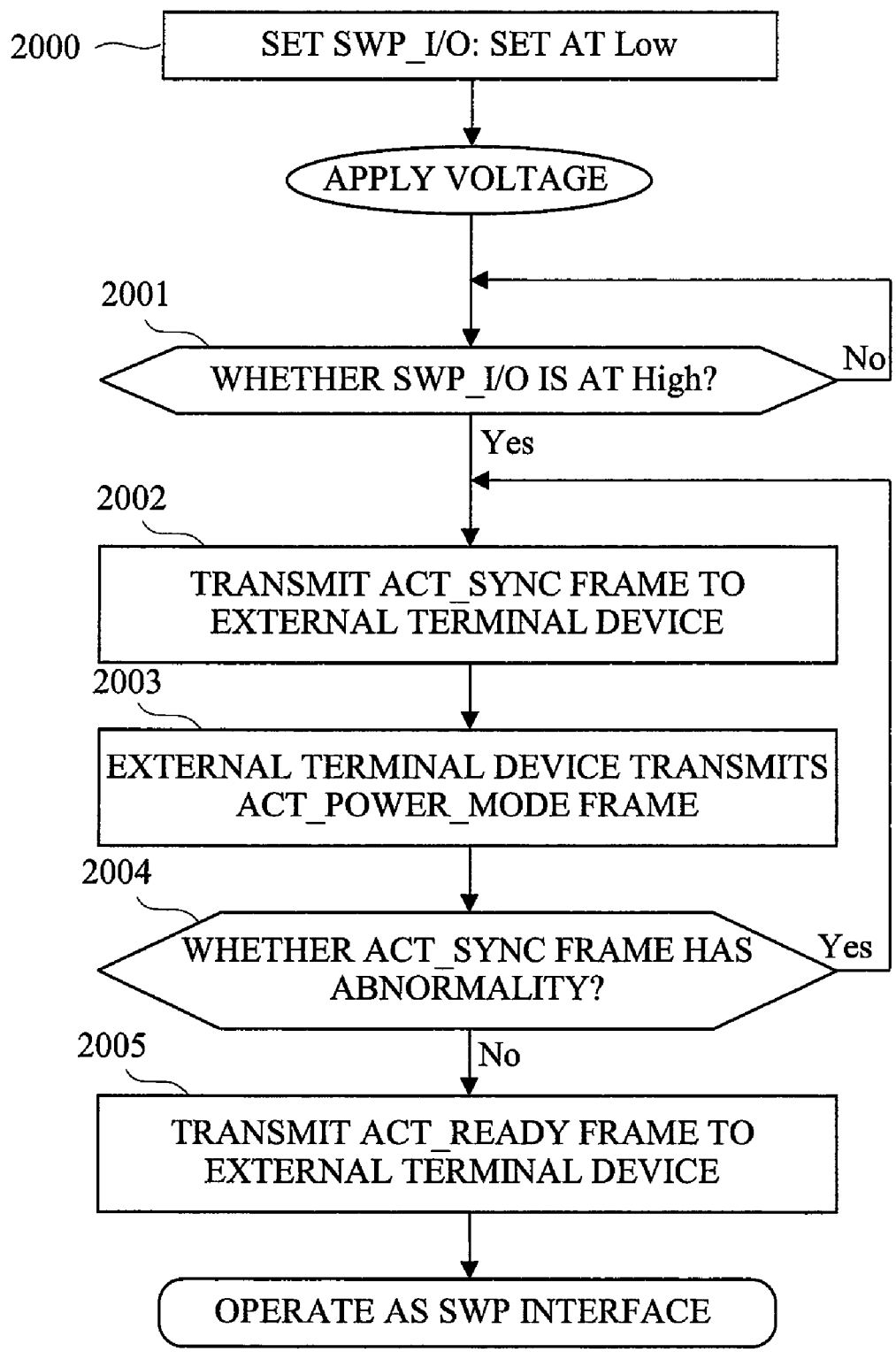
FIG. 20 is a drawing showing an example of the flow of an initial operation in the processing device according to the third embodiment of the present invention.

FIG. 20 is a drawing showing an example of a flow of an initial operation in the processing device 100 having the SWP interface. Note that the SWP interface operates independently of the ISO 7816 interface and the USB interface. Therefore, the flow of the initial operation of the ISO 7816 interface and the USB interface in the processing device 100 having the SWP interface is similar to that of FIG. 3 in the first embodiment.

Before a voltage is applied, SWP_I/O 1917 is set in a Low state (step 2000). After a voltage is applied and reaches a defined operation voltage, it is determined whether SWP_I/O 1917 is in a High state (step 2001). Only when the determination condition in step 2001 is satisfied, an SWP interface activation procedure which will be described below is performed.

In the SWP interface activation procedure, upon detection that SWP_I/O 1917 becomes a High state, the processing device 100 transmits an ACT_SYNC frame to the external terminal device as a response thereof (step 2002). The external terminal device receiving the ACT_SYNC frame then transmits an ACT_POWER_MODE frame in accordance with the received ACT_SYNC frame and the specifications of the external terminal device to the processing device 100 (step 2003). The ACT_POWER_MODE frame transmitted from the external terminal device includes, for example, a bit indicative of a mode (full power mode or low power mode) with which the external terminal device complies and a bit indicative of an abnormality in the received ACT_SYNC frame.

When the received ACT_POWER_MODE frame indicates that the ACT_SYNC frame has an abnormality (step 2004), the procedure returns to step 2002, in which the processing device 100 retransmits the ACT_SYNC frame. When the received ACT_POWER_MODE frame indicates in step 2004 that the ACT_SYNC frame does not have any abnormality, an ACT_READY frame is transmitted to the external terminal device (step 2005).

Only when the above-described processes are normally performed, the SWP interface is activated, and the processing device 100 operates as a device for performing the data transfer with the SWP interface. If the above-described processes are not normally performed, the processing device 100 does not operate with the SWP interface. At this time, when the ISO 7816 interface or the USB interface is normally activated, the processing device 100 operates with the normally-activated interface.

Figure 21:
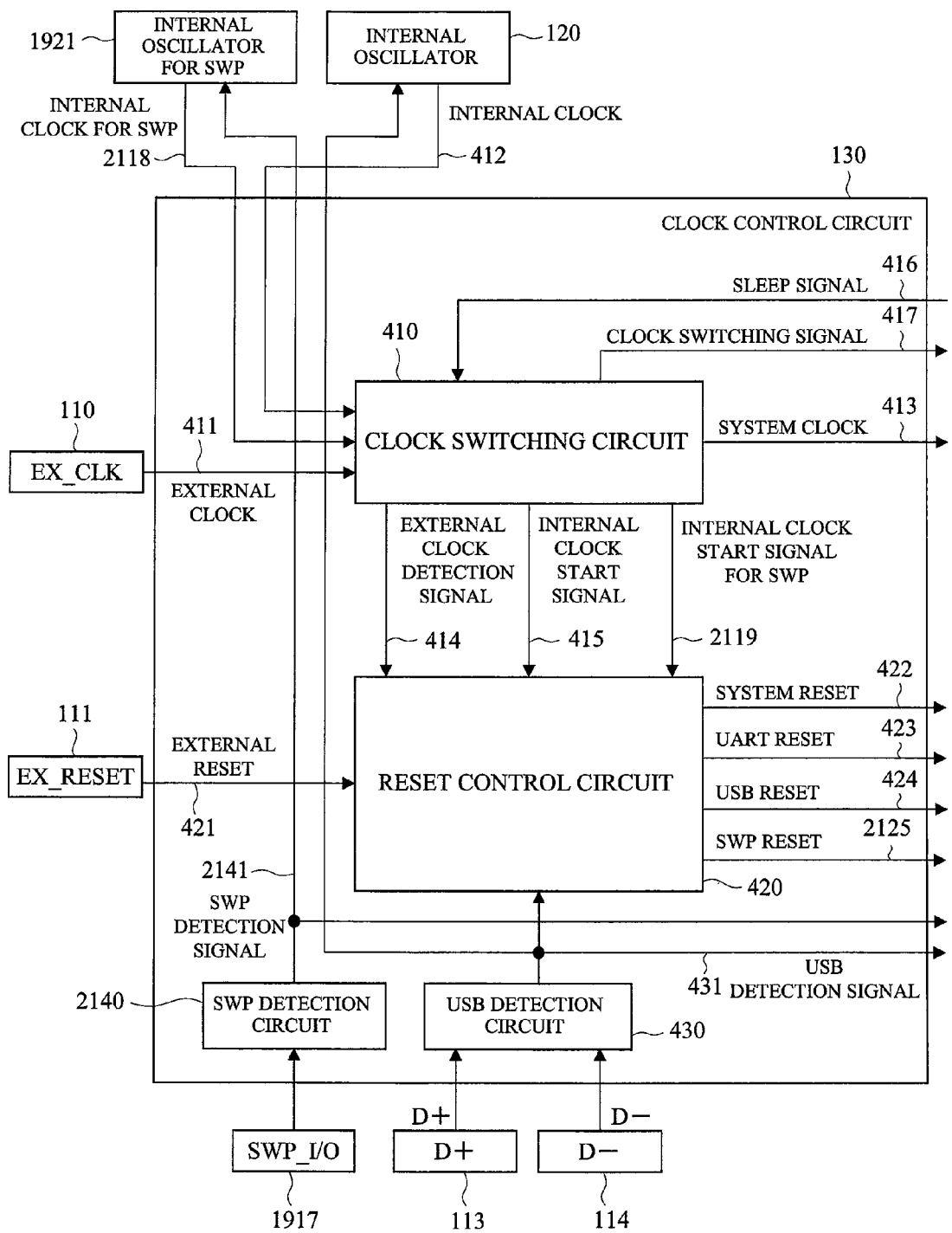
FIG. 21 is a drawing showing a configuration example of modules included in a clock control circuit in the processing device according to the third embodiment of the present invention.

FIG. 21 is a drawing showing a configuration example of modules included in the clock control circuit 130 in the processing device 100 according to the present embodiment. Here, an SWP detection circuit 2140, an SWP detection signal 2141, an internal clock for SWP 2118, an internal clock start signal for SWP 2119, and an SWP reset 2125 are added to the configuration of the clock control circuit 130 of FIG. 4 in the first embodiment. Note that the SWP detection circuit 2140 may be mounted in the SWP control circuit 1944.

The SWP detection circuit 2140 is a module that monitors the state of a signal line of SWP_I/O 1917, and causes the SWP detection signal 2124 to be set in a High state when detecting that SWP_I/O 1917 is in a High state. The SWP detection signal 2141 is a signal for notifying the CPU 141 and other modules that data is to be transferred with the SWP interface.

When the SWP detection signal 2141 becomes a High state, the internal oscillator for SWP 1921 starts to generate the internal clock for SWP 2118. However, the supply of the internal clock for SWP 2118 to the CPU 141 and others is required to wait until its oscillation is stabilized. The internal clock start signal for SWP 2119 is a signal that causes the internal clock for SWP 2118 generated by the internal oscillator for SWP 1921 to be set in High state when it is supplied to the CPU 141, each interface control circuit and others. The SWP reset 2125 is a signal for supplying a reset only to the module required for the processing of data transferred via the SWP interface.

Figure 22:
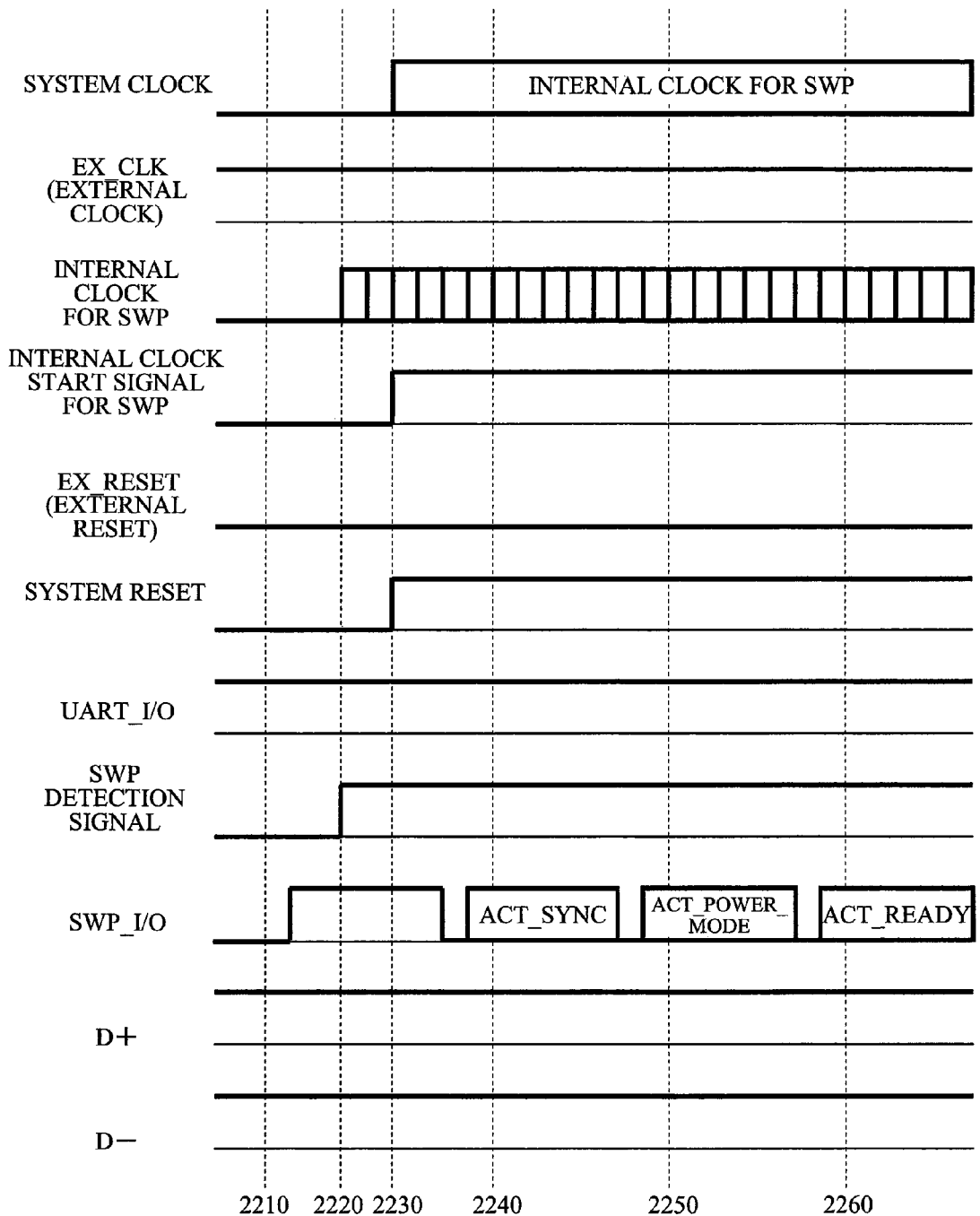
FIG. 22 is a drawing showing an example of a timing chart of an SWP interface activation procedure in the processing device according to the third embodiment of the present invention.

FIG. 22 is a drawing showing an example of a timing chart of an SWP interface activation procedure in the processing device 100 according to the present embodiment. First, before a voltage is applied, EX_CLK 110 is set in a Low state, EX_RESET 111 is set in a Low state, UART_I/O 112 is set in a High state, SWP_I/O 1917 is set in a Low state, D+ 113 is set in a High state, and D− 114 is set in a High state (timing 2210). After a voltage is applied, when the SWP detection circuit 2140 detects that SWP_I/O 1917 is in a High state, the SWP detection circuit 2140 sets the SWP detection signal 2141 in a High state (timing 2220).

Upon detection that the SWP detection signal 2141 becomes a High state, the internal oscillator for SWP 1921 generates the internal clock for SWP 2118. Then, the internal oscillator for SWP 1921 waits until the oscillation of the internal clock for SWP 2118 is stabilized by using the timer in the internal oscillator for SWP 1921, and after it is stabilized, it supplies the internal clock for SWP 2118 to the CPU 141, each interface control circuit and others via the clock switching circuit 410 (timing 2230).

At this time, the clock switching circuit 410 sets the internal clock start signal for SWP 2218 in a High state. Note that the internal clock for SWP 2118 does not have to be supplied to the UART control circuit 142 and the USB control circuit 143. Also, after confirming that the SWP detection signal 2141 is in a High state and the internal clock start signal for SWP 2119 is in a High state, the reset control circuit 420 sets the system reset 422 in a High state (timing 2230). Note that, in place of the system reset 422, the SWP reset 2125 may be set in a High state.

When the system reset 422 becomes a High state, the SWP control circuit 1944 transmits an ACT_SYNC frame to the external terminal device (timing 2240). The external terminal device receiving the ACT_SYNC frame transmits an ACT_POWER_MODE frame to the processing device 100 (timing 2250). The processing device 100 receiving the ACT_POWER_MODE frame checks that frame and transmits an ACT_READY frame to the external terminal device only when no abnormality is found therein (timing 2260). Note that the above-described processes may be performed by dedicated hardware in place of the SWP control circuit 1944.

All of the processes described above can be performed by hardware by using the clock control circuit 130 as well as the SWP control circuit 1944. In the following, however, an example of a method of activating the SWP interface by the use of firmware mounted in a ROM or the like incorporated in the CPU 141 will be described.

The configuration of a register used in the activation of the SWP interface is similar to the configuration shown in FIG. 15 according to the first embodiment, but values to be set are different. In the present embodiment, in FIG. 15, CLK_SELECT 1501 represents a bit indicative of a supply source of the system clock 413. For example, if the bit is "00", the external clock 411 is the supply source. If the bit is "01", the internal clock 412 is the supply source. If the bit is "10", the internal clock for SWP 2118 is the supply source. RESET_SELECT 1502 represents a bit indicative of validity/invalidity of the external reset 421. For example, if the bit is "0", the external reset 421 is invalid. If the bit is "1", the external reset 421 is valid.

MODE_SELECT 1503 represents a bit indicative of a usable interface. For example, if the bit is "001", the ISO 7816 interface can be used. If the bit is "010", the USB interface can be used. If the bit is "100", the SWP interface can be used. Furthermore, if the bit is "011", both the ISO 7816 interface and the USB interface can be used. If the bit is "101", both the ISO 7816 interface and the SWP interface can be used. If the bit is "110", both the USB interface and the SWP interface can be used. If the bit is "111", all of the interfaces can be used.

DPPU 1511 represents a bit for pulling up D+ 113 or D− 114 when "1" is set thereto, for example. USB_DETECT 1512 represents a bit to which "1" is set when the USB detection circuit 430 detects that D+ 113 and D− 114 are in a Low state for at least 10 ms. USB_MODE 1513 represents a bit indicative of a speed of the USB interface. For example, a bit of "0" indicates Low Speed, and a bit of "1" indicates Full Speed.

DP 1521 represents a bit indicative of the state of D+ 113. For example, when the bit is "0", D+ 113 is in a Low state, and when the bit is "1", it is in a High state. DM 1522 represents a bit indicative of the state of D− 114. For example, when the bit is "0", D− 114 is in a Low state, and when the bit is "1", it is in a High state.

Figure 23:
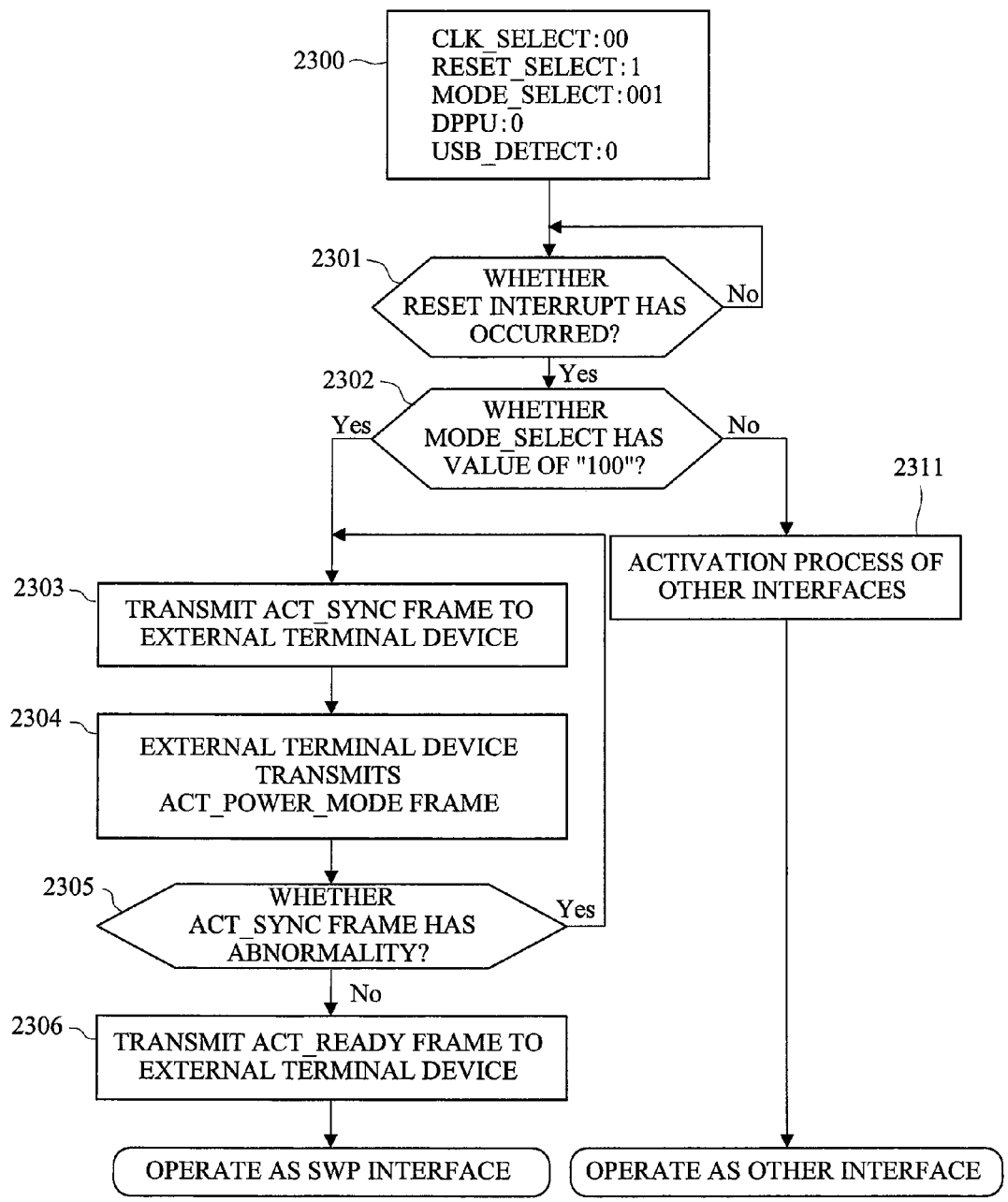
FIG. 23 is a flow diagram showing an example of an SWP interface activation procedure by the use of firmware in the processing device according to the third embodiment of the present invention.

FIG. 23 is a flow diagram showing an example of an SWP interface activation procedure by the use of firmware in the processing device 100 according to the present embodiment. Before a voltage is applied, CLK_SELECT 1501 is set at "00", RESET_SELECT 1502 is set at "1", MODE_SELECT 1503 is set at "001", DPPU 1511 is set at "0", and USB_DETECT 1512 is set at "0" (step 2300). Note that USB_MODE 1513, DP 1521, and DM 1522 can be set at different values in accordance with the specifications of the processing device 100. In the processing device 100 according to the present embodiment, however, it is assumed that they are all set at "1".

After a voltage is applied, when a reset interrupt occurs in the CPU 141 (step 2301), the firmware confirms the value of MODE_SELECT 1503 in a reset interrupt function (step 2302). Note that it is assumed that the value of MODE_SELECT 1503 is set by the reset control circuit 420.

When MODE_SELECT 1503 has a value of "100", the firmware transmits an ACT_SYNC frame to the external terminal device (step 2303). The external terminal device receiving the ACT_SYNC frame then transmits an ACT_POWER_MODE frame to the processing device 100 (step 2304). The processing device 100 receiving the ACT_POWER_MODE frame then checks the received frame (step 2305), and transmits an ACT_READY frame to the external terminal device only when the transmitted ACT_SYNC frame does not have any abnormality (step 2306).

Only when the above-described processes are normally performed, the SWP interface is activated, and the processing device 100 operates as a device for performing the data transfer with the SWP interface. Note that the configuration in which the SWP control circuit 1944 performs the processes up to the transmission of the ACT_READY frame by hardware and an interrupt is generated to the CPU 141 only when all are normally operated may also be possible.

When MODE_SELECT 1503 has a value other than "100" such as "001", "010", or "011" in step 2302, the procedure of activating the ISO 7816 interface and/or the USB interface is performed in accordance with the procedure described in the first embodiment (step 2311).

With the above-described processes, the SWP interface can be activated in the processing device 100. Here, as shown in FIG. 2, an external terminal used in data transfer with the SWP interface and external terminals used in data transfer with the ISO 7816 interface and the USB interface are different from each other. Therefore, it is physically possible to use the three interfaces at the same time.

However, as a result of the process of the initial operation described above, the processing device 100 operates by the external clock 411 when operating with the ISO 7816 interface, operates by the internal clock 412 when operating with the USB interface, and operates by the internal clock for SWP 2118 when operating with the SWP interface. For this reason, the system clock 413 has to be specified to one of these clocks in accordance with the combination of the interfaces to be used.

In general, the SWP interface is used for the purpose of non-contact communication. Therefore, it is difficult in terms of time to switch the system clock to the external clock 411 or the internal clock 412 during the operation with the SWP interface. Thus, when the procedure of activating the ISO 7816 interface or the USB interface starts during the operation with the SWP interface, the clock system is not changed and the system clock 413 remains unchanged as the internal clock for SWP 2118.

Also, when comparing the USB interface and the SWP interface, since the USB interface handles a larger amount of data, the internal clock 412 is faster than the internal clock for SWP 2118 in general. Therefore, when the SWP interface activation procedure starts during the operation with the USB interface, the clock system is not changed and the system clock 413 remains unchanged as the internal clock 412.

Note that, although the external clock 411 can be used even for the data transfer with the SWP interface, there is no guarantee that the external clock 411 will be continuously supplied during the process with the SWP interface. Therefore, when the activation of the SWP interface starts during the operation with the ISO 7816 interface, the system clock 413 is changed from the external clock 411 to the internal clock for SWP 2118.

However, when the external clock 411 is switched to the internal clock for SWP 2118 during the operation of the processing device 100, noise occurs at the time of switching, and there is the possibility that a malfunction occurs in the CPU 141. For its prevention, in the processing device 100 according to the present embodiment, similar to that shown in FIG. 4 in the first embodiment, the clock control circuit 430 includes the sleep signal 416 and the clock switching signal 417.

Figure 24:
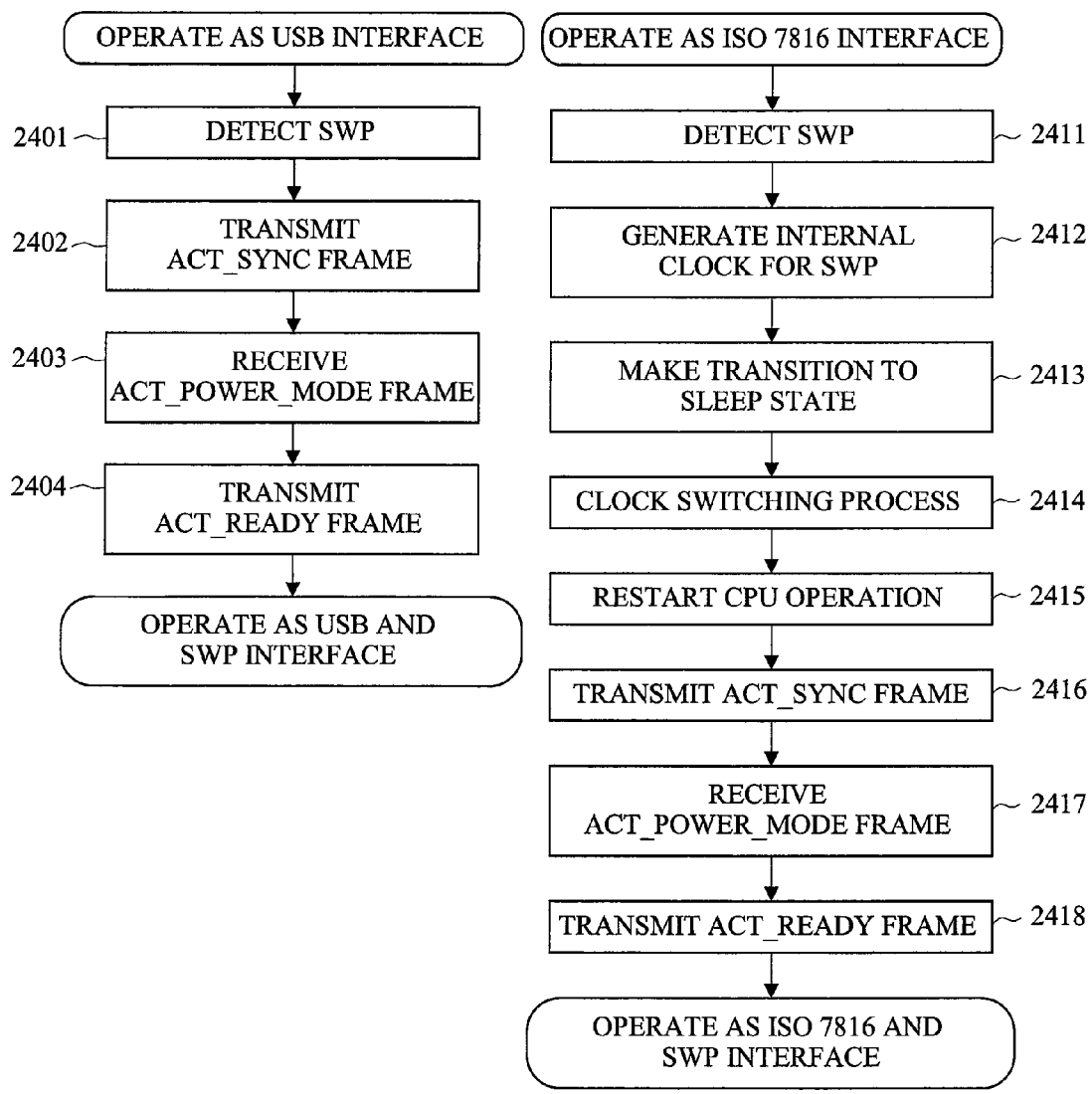
FIG. 24 is a flow diagram showing an example of the flow in an SWP interface activation procedure during an operation with a USB interface or an ISO 7816 interface in the processing device according to the third embodiment of the present invention.
Figure 25:
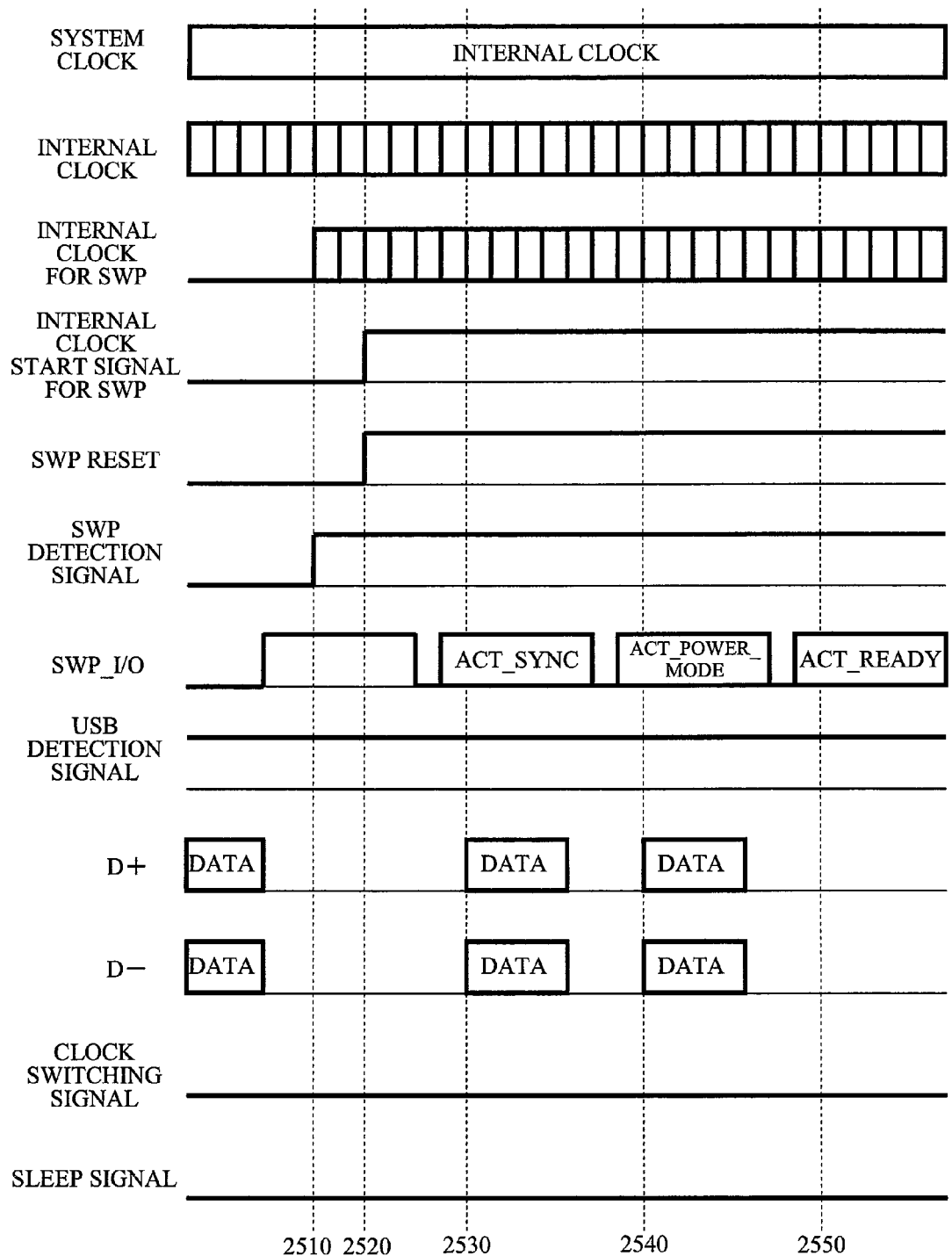
FIG. 25 is an example of a timing chart of an SWP interface activation procedure during an operation with the USB interface in the processing device according to the third embodiment of the present invention.
Figure 26:
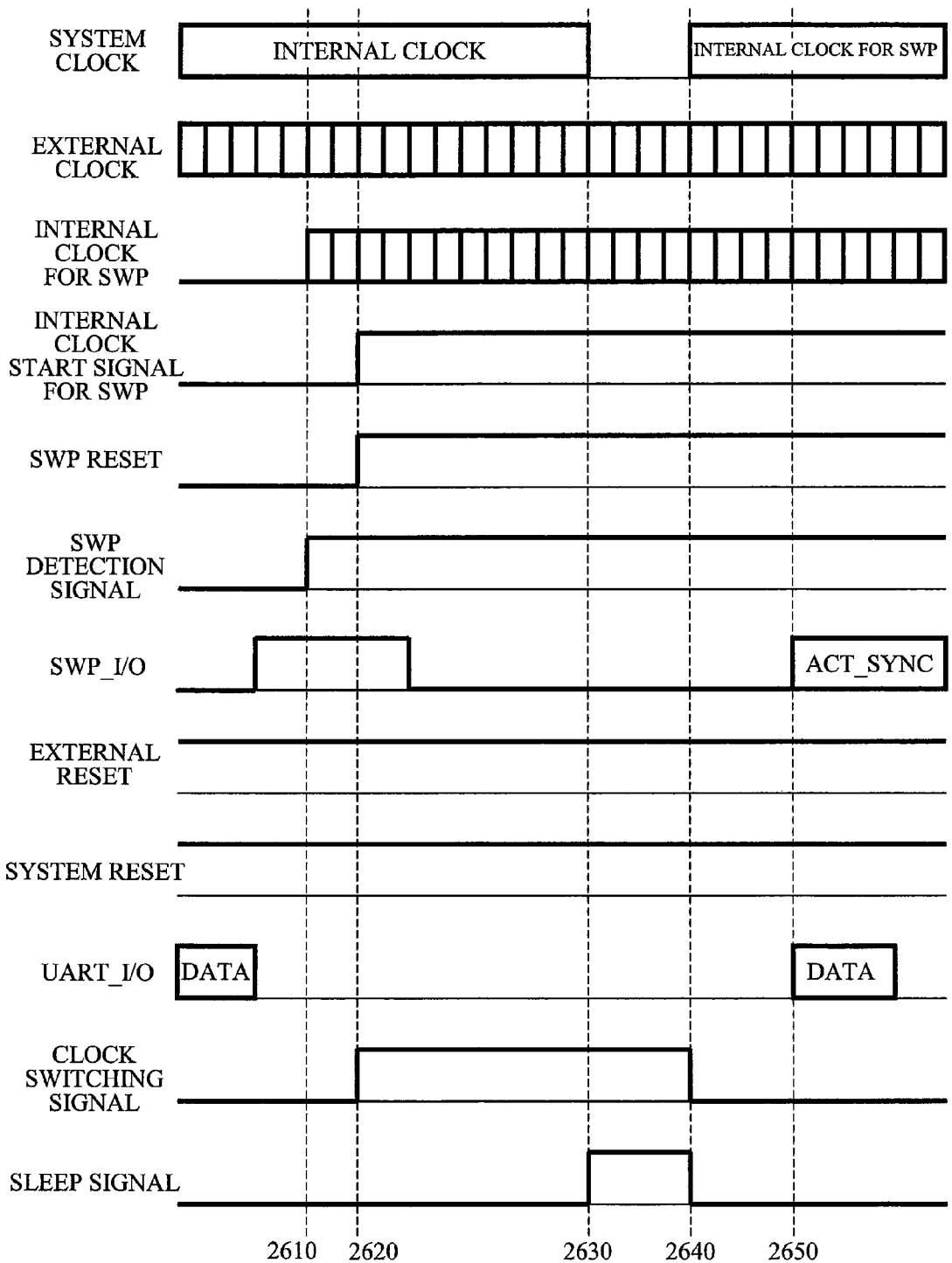
FIG. 26 is an example of a timing chart of an SWP interface activation procedure during an operation with the ISO 7816 interface in the processing device according to the third embodiment of the present invention.

A method of activating the SWP interface during when the processing device 100 according to the present embodiment operates with the USB interface and a method of activating the SWP interface during when the processing device 100 according to the present embodiment operates with the ISO 7816 interface will be described below. FIG. 24 is a flow diagram showing an example of the flow in an SWP interface activation procedure during when the processing device 100 according to the present embodiment operates with the USB interface or the ISO 7816 interface. Also, FIG. 25 is an example of a timing chart of an SWP interface activation procedure during when the processing device 100 according to the present embodiment operates with the USB interface. Further, FIG. 26 is an example of a timing chart of an SWP interface activation procedure during when the processing device 100 according to the present embodiment operates with the ISO 7816 interface.

First, when the processing device 100 is operating with the USB interface, if the SWP detection circuit 2140 detects that SWP_I/O 1917 has been changed from a Low state to a High state (step 2401), the SWP interface activation procedure starts. At this time, the SWP detection circuit 2140 sets the SWP detection signal 2141 in a High state (timing 2510).

Upon detection that the SWP detection signal 2141 becomes a High state, the internal oscillator for SWP 1921 generates the internal clock for SWP 2118 (timing 2510). After the internal clock for SWP 2118 is stabilized, the clock switching circuit 410 sets the internal clock start signal for SWP 2119 in a High state (timing 2520). At this time, the clock switching circuit 410 supplies the internal clock 412 to the SWP control circuit 1944.

Upon detection that the internal clock start signal for SWP 2119 becomes a High state, the reset control circuit 420 sets the SWP reset signal 2125 in a High state (timing 2520). Note that the timing of setting the SWP reset signal 2125 in a High state may be identical to the timing at which the SWP detection signal 2141 becomes a High state (timing 2510).

Upon detection that the SWP reset signal 2125 becomes a High state, the SWP control circuit 1944 transmits an ACT_SYNC frame to the external terminal device (step 2402, timing 2530). Note that the SWP control circuit 1944 may transmit an ACT_SYNC frame to the external terminal device upon detection that the SWP detection signal 2141 becomes a High state.

The external terminal device receiving the ACT_SYNC frame then transmits an ACT_POWER_MODE frame to the processing device 100 (step 2403, timing 2540). The processing device 100 receiving the ACT_POWER_MODE frame then transmits an ACT_READY frame to the external terminal device (step 2404, timing 2550).

Only when the above-described processes are normally performed, the SWP interface is activated during the operation with the USB interface, and the processing device 100 can operate with simultaneously using both the USB interface and the SWP interface.

When the processing device 100 is operating with the ISO 7816 interface, if the SWP detection circuit 2140 detects that SWP_I/O 1917 has been changed from a Low state to a High state (step 2411), the SWP interface activation procedure starts. At this time, the SWP detection circuit 2140 sets the SWP detection signal in a High state (timing 2610).

Upon detection that the SWP detection signal 2141 becomes a High state, the internal oscillator for SWP 1921 generates the internal clock for SWP 2118 (step 2412, timing 2610). After the internal clock for SWP 2118 is stabilized, the clock switching circuit 410 sets the internal clock start signal for SWP 2119 in a High state, and after confirming that the external clock 411 and the internal clock for SWP 2118 have been both supplied, it sets the clock switching signal 417 in a High state (timing 2620). Also, upon detection that the internal clock start signal for SWP 2119 becomes a High state, the reset control circuit 420 sets the SWP reset signal 2125 in a High state (timing 2620).

Upon detection that the clock switching signal 417 becomes a High state, the CPU 141 performs a process required to make a transition to a sleep state (setting of register, storing of current state and others) and a reset process regarding a process of the SWP interface. After the required process is completed, the sleep signal 416 is set in a High state, and then a transition to a sleep state is made (step 2413, timing 2630).

Upon detection that the sleep signal 416 becomes a High state, the clock switching circuit 410 switches the system clock 413 from the external clock 411 to the internal clock for SWP 2118 (step 2414, timing 2640). After the system clock 413 is switched, an interrupt signal is transmitted to the CPU 141 to restart the operation of the CPU 141 (step 2415). At this time, the clock switching circuit 410 sets the clock switching signal 417 and the sleep signal 416 in a Low state (timing 2640).

After the restart of the operation of the CPU 141, the SWP control circuit 1944 transmits an ACT_SYNC frame to the external terminal device (step 2416, timing 2650). The external terminal device receiving the ACT_SYNC frame then transmits an ACT_POWER_MODE frame to the processing device 100 (step 2417). The processing device 100 receiving the ACT_POWER_MODE frame then transmits an ACT_READY frame to the external terminal device (step 2418).

Only when the above-described processes are normally performed, the SWP interface is activated during the operation with the ISO 7816 interface, and the processing device 100 can operate with simultaneously using both the ISO 7816 interface and the SWP interface. Note that, when the SWP interface activation procedure is performed during the operation with the ISO 7816 interface, similar to the case of performing the SWP interface activation procedure during the operation with the USB interface, the system clock 413 is not switched from the external clock to the internal clock for SWP 2118 and the operation may be performed with the system clock 413 remaining unchanged as the external clock 411.

When the SWP interface activation procedure is performed during when the processing device 100 operates with both the USB interface and the ISO 7816 interface, the SWP interface is activated in the same manner as that of steps 2401 to 2404. Also, when the SWP interface activation procedure is performed during when the processing device 100 operates with both the USB interface and the ISO 7816 interface, the system clock 413 may be switched to the internal clock for SWP 2118 in the same manner as that of steps 2411 to 2418.

All of the processes described above can be performed by hardware by using the clock control circuit 130 as well as the UART control circuit 142, the USB control circuit 143, and the SWP control circuit 1944. In the following, however, an example of a method of activating the SWP interface during the operation with the ISO 7816 interface by the use of firmware mounted in a ROM or the like incorporated in the CPU 141 will be described.

Figure 27:
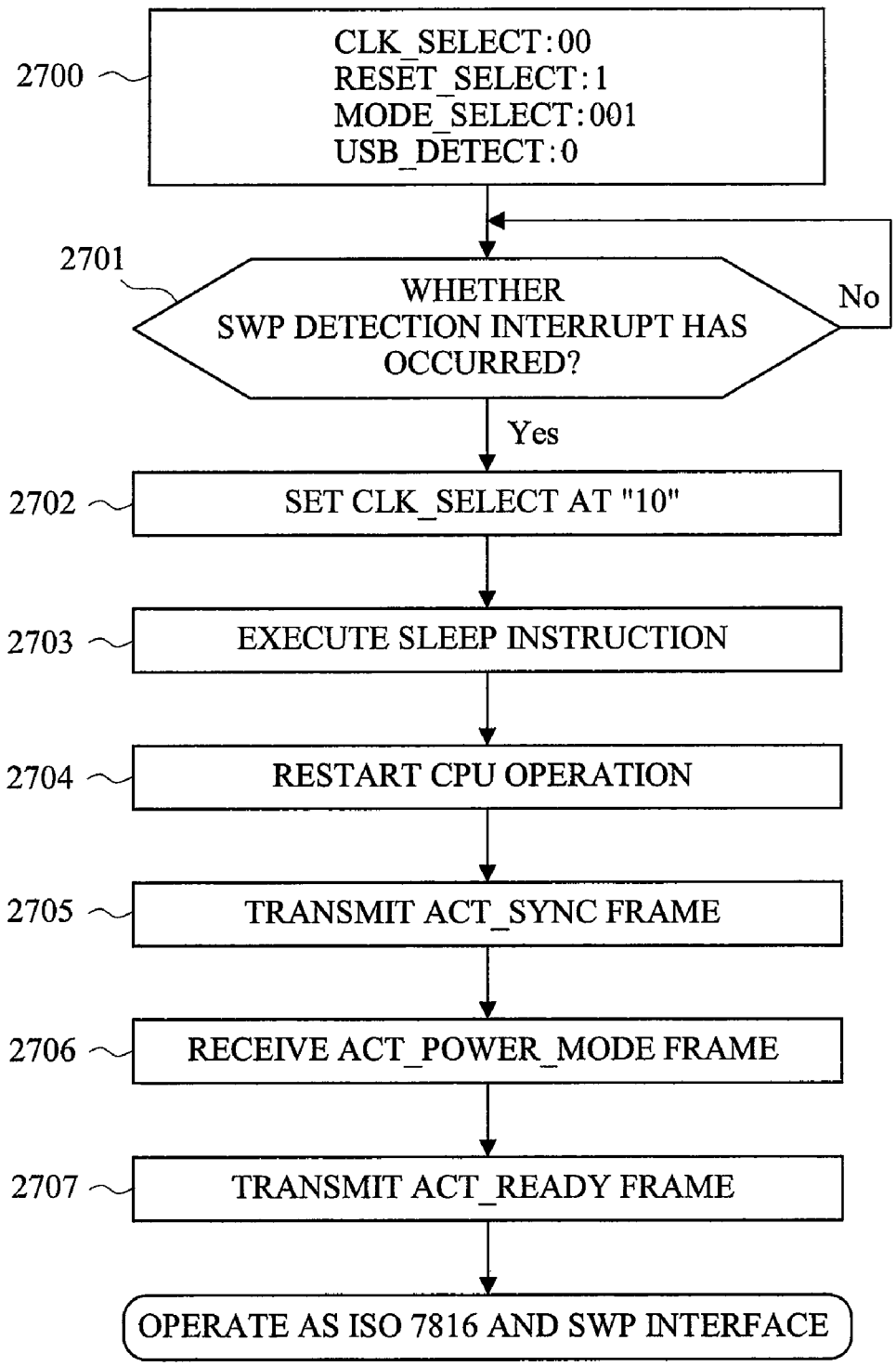
FIG. 27 is a flow diagram showing an example of a flow in an SWP interface activation procedure during an operation with an ISO 7816 interface by the use of firmware in the processing device according to the third embodiment of the present invention.

FIG. 27 is a flow diagram showing an example of the flow in an SWP interface activation procedure during when the processing device 100 according to the present embodiment operates with the ISO 7816 interface by the use of firmware. When the processing device 100 is operating with the ISO 7816 interface, CLK_SELECT 1501 is set at "00", RESET_SELECT 1502 is set at "1", MODE_SELECT 1503 is set at "001", and USB_DETECT 1512 is set at "0" (step 2700).

When the processing device 100 is operating with the ISO 7816 interface, upon detection that the SWP_I/O 1917 has been changed from a Low state to a High state, the clock control circuit 130 or the SWP control circuit 1944 generates an SWP detection interrupt to the CPU 141 (step 2701). The firmware sets CLK_SELECT 1501 at "10" in a SWP detection interrupt function (step 2702), and executes a sleep instruction to cause the CPU 141 to make a transition to a sleep state (step 2703).

When the sleep instruction is executed, the sleep signal 416 becomes a High state. Therefore, the clock switching circuit 410 switches the system clock 413 to the internal clock for SWP 2118, and transmits an interrupt signal to the CPU 141 to restart the operation of the CPU 141 (step 2704). After the restart of the operation of the CPU 141, the firmware transmits an ACT_SYNC frame to the external terminal device (step 2705).

The external terminal device receiving the ACT_SYNC frame transmits an ACT_POWER_MODE frame to the processing device 100 (step 2706). The processing device 100 receiving the ACT_POWER_MODE frame transmits an ACT_READY frame to the external terminal device (step 2707).

Only when the above-described processes are normally performed, the SWP interface is activated during the operation with the ISO 7816 interface, and the processing device 100 can operate with simultaneously using both the ISO 7816 interface and the SWP interface. Note that, also when the system clock 413 is switched in the SWP interface activation procedure from the internal clock 412 to the clock for SWP 2118 during when the processing device 100 operates with the USB interface or with both the ISO 7816 interface and the USB interface, a procedure similar to that of steps 2701 to 2707 can be performed.

Next, a method of deactivating the SWP interface during when the processing device 100 according to the present embodiment operates with both the ISO 7816 interface and the SWP interface will be described. Also, when the ISO 7816 interface is deactivated during an operation with both the ISO 7816 interface and the SWP interface, a procedure similar to that of steps 1101 to 1102 in FIG. 11 and the timings 1210 to 1220 according to the first embodiment can be performed.

Figure 28:
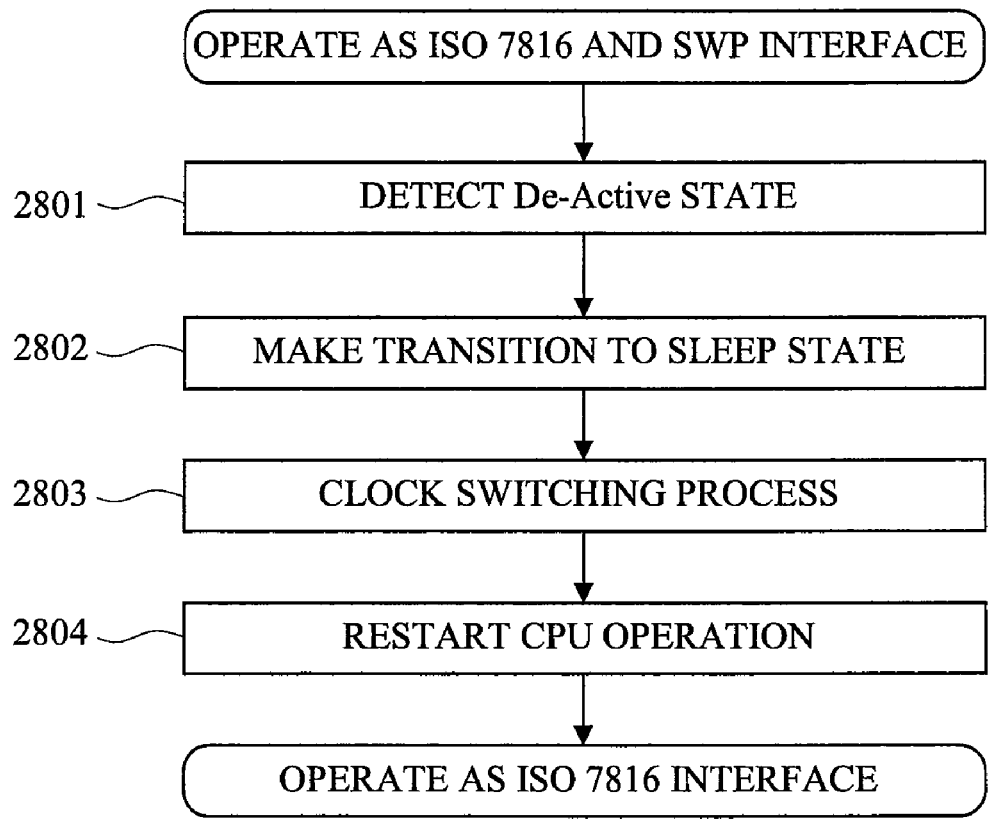
FIG. 28 is a flow diagram showing an example of a flow in an SWP interface deactivation procedure during an operation with both an ISO 7816 interface and an SWP interface in the processing device according to the third embodiment of the present invention.

FIG. 28 is a flow diagram showing an example of the flow in an SWP interface deactivation procedure during when the processing device 100 according to the present embodiment operates with both the ISO 7816 interface and the SWP interface. Also, FIG. 29 is an example of a timing chart of the SWP interface deactivation procedure during when the processing device 100 according to the present embodiment operates with both the ISO 7816 interface and the SWP interface.

When the processing device 100 is operating with both the ISO 7816 interface and the SWP interface, if the SWP detection circuit 2140 detects that SWP_I/O 1917 becomes a De-Active state (step 2801), the SWP interface deactivation procedure starts. Upon detection that SWP_I/O 1917 becomes a De-Active state, the SWP detection circuit 2140 sets the SWP detection signal 2141 in a Low state (timing 2910).

Upon detection that the SWP detection signal 2141 becomes a Low state, the CPU 141 performs a process required to make a transition to a sleep state (setting of register, storing of current state and others). After the required process is completed, the sleep signal 416 is set in a High state, and a transition to a sleep state is made (step 2802, timing 2920).

Upon detection that the sleep signal 416 becomes a High state, the clock switching circuit 410 switches the system clock 413 from the internal clock for SWP 2118 to the external clock 411 (step 2803, timing 2930). At this time, the internal clock for SWP 2118 may be terminated. Note that the internal clock for SWP 2118 can be terminated by setting the internal clock start signal for SWP 2119 in a Low state (timing 2930).

After the system clock 413 is switched, an interrupt signal is transmitted to the CPU 141 to restart the operation of the CPU 141 by the external clock 411 (step 2804, timing 2940). When the above-described processes are normally performed, the SWP interface is deactivated, and the processing device 100 operates only with the ISO 7816 interface.

All of the processes described above can be performed by hardware by using the clock control circuit 130 as well as the UART control circuit 142 and the SWP control circuit 1944. In the following, however, a method of deactivating the SWP interface during an operation with both the ISO 7816 interface and the SWP interface by the use of firmware mounted in a ROM or the like incorporated in the CPU 141 will be described.

FIG. 30 is a flow diagram showing an example of the flow in an SWP interface deactivation procedure during when the processing device 100 according to the present embodiment operates with both the ISO 7816 interface and the SWP interface by the use of firmware. When the processing device 100 is operating with both the ISO 7816 interface and the SWP interface, CLK_SELECT 1501 is set at "10", RESET_SELECT 1502 is set at "0", MODE_SELECT 1503 is set at "101", and USB_DETECT 1512 is set at "1" (step 3000).

Upon detection that SWP_I/O 1917 becomes a De-Active state, the SWP detection circuit 2140 or the SWP control circuit 1944 generates an SWP deactivation interrupt to the CPU 141 (step 3001). The firmware sets CLK_SELECT 1501 at "00" in a SWP deactivation interrupt function (step 3002), and executes a sleep instruction to cause the CPU 141 to make a transition to a sleep state (step 3003).

When the sleep instruction is executed, the sleep signal 416 becomes a High state. Therefore, the clock switching circuit 410 switches the system clock 413 to the external clock 411, and transmits an interrupt signal to the CPU 141 to restart the operation of the CPU 141 (step 3004). When the above-described processes are normally performed, the SWP interface is deactivated, and the processing device 100 operates only with the ISO 7816 interface.

When the processing device 100 is operating with the USB interface and the SWP interface, if the clock system of the system clock 413 is to be changed due to the deactivation of the USB interface, a procedure similar to that of steps 1111 to 1114 of FIG. 11 or steps 1811 to 1814 of FIG. 18 in the first embodiment can be performed. Also, if the clock system of the system clock 413 is to be changed due to the deactivation of the SWP interface, a procedure similar to that of steps 2801 to 2804 of FIG. 28 or steps 3001 to 3004 of FIG. 30 can be performed.

As described in the foregoing, in the processing device 100 according to the present embodiment, even if the device has an SWP interface for data transfer complying with SWP, the system clock 413 can be switched among the external clock 411, the internal clock 412 and the internal clock for SWP 2118 by the means in which a malfunction of the CPU 141 due to noise at the time of clock switching does not occur.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be used for a processing device having a plurality of interfaces for data transfer and a clock control method thereof, and in particular, it can be used for a processing device such as an IC card complying with ISO 7816.

What is claimed is:

1. A processing device, comprising:
a CPU;
a first interface for performing data transfer with an external terminal device in synchronization with an external clock supplied from the external terminal device;
a first control circuit for the first interface;
a clock generation circuit that generates a clock;
a second interface for performing data transfer with the external terminal device by using an internal clock generated by the clock generation circuit;
a second control circuit for the second interface; and
a clock control circuit that switches a system clock used by at least the CPU in the processing device between the external clock and the internal clock in accordance with either one of the first and second interfaces used by the processing device in data transfer with the external terminal device,
wherein, when the system clock is switched between the external clock and the internal clock, the processing device causes the CPU to be in a sleep state and performs the switching by the clock control circuit, and after the switching is completed, the processing device releases the sleep state of the CPU to restart an operation, and
an external terminal complying with ISO 7816-2, wherein the first interface is an interface for performing data transfer complying with ISO 7816-3, and the second interface is an interface for performing USB transfer complying with ISO 7816-12.

2. The processing device according to claim 1, further comprising:
a reset control circuit that selects a reset signal to be supplied to the processing device in accordance with either one of the first and second interfaces used by the processing device in data transfer with the external terminal device.

3. The processing device according to claim 1, wherein, as interfaces used to perform data transfer with the external terminal device, both the interface for performing data transfer complying with ISO 7816-3 and the interface for performing USB transfer complying with ISO 7816-12 can be simultaneously used.

4. The processing device according to claim 3, wherein, when both the interface for performing data transfer complying with ISO 7816-3 and the interface for performing USB transfer complying with ISO 7816-12 are simultaneously used as interfaces used to perform data transfer with the external terminal device, the internal clock is used as the system clock, and when the interface for performing USB transfer complying with ISO 7816-12 is activated during when the interface for performing data transfer complying with ISO 7816-3 is being used as an interface used to perform data transfer with the external terminal device, the system clock is switched from the external clock to the internal clock.

5. The processing device according to claim 3, wherein, when both the interface for performing data transfer complying with ISO 7816-3 and the interface for performing USB transfer complying with ISO 7816-12 are simultaneously used as interfaces used to perform data transfer with the external terminal device, the external clock is used as the system clock, and when supply of the external clock is detected during when the interface for performing USB transfer complying with ISO 7816-12 is being used as an interface used to perform data transfer with the external terminal device, the system clock is switched from the internal clock to the external clock.

6. The processing device according to claim 4, wherein, when the interface for performing USB transfer complying with ISO 7816-12 is deactivated while both the interface for performing data transfer complying with ISO 7816-3 and the interface for performing USB transfer complying with ISO 7816-12 are simultaneously used as interfaces used to perform data transfer with the external terminal device and the internal clock is used as the system clock, the system clock is switched from the internal clock to the external clock.

7. The processing device according to claim 5, wherein, when the interface for performing data transfer complying with ISO 7816-3 is deactivated while both the interface for performing data transfer complying with ISO 7816-3 and the interface for performing USB transfer complying with ISO 7816-12 are simultaneously used as interfaces used to perform data transfer with the external terminal device and the external clock is used as the system clock, the system clock is switched from the external clock to the internal clock.

8. A processing device, comprising:
a CPU;
an interface for performing data transfer with an external terminal device in synchronization with an external clock supplied from the external terminal device;
a control circuit that controls the data transfer;
a clock generation circuit that generates a clock; and
a clock control circuit that switches a system clock used by at least the CPU in the processing device by a command transmitted from the external terminal device between the external clock and an internal clock generated by the clock generation circuit,
wherein, when the system clock is switched between the external clock and the internal clock, the processing device causes the CPU to be in a sleep state and performs the switching by the clock control circuit, and after the switching is completed, the processing device releases the sleep state of the CPU to restart an operation, and
an external terminal complying with ISO 7816-2, wherein the interface is an interface for performing data transfer complying with ISO 7816-3.

9. A processing device, comprising:
a CPU;
a first interface for performing data transfer with an external terminal device in synchronization with an external clock supplied from the external terminal device;
a control circuit for the first interface;
a first clock generation circuit that generates a clock;
a second interface for performing data transfer with the external terminal device by using a first internal clock generated by the first clock generation circuit;
a control circuit for the second interface;
a second clock generation circuit that generates a clock;
a third interface for performing data transfer with the external terminal device by using a second internal clock generated by the second clock generation circuit;
a control circuit for the third interface; and
a clock control circuit that switches a system clock used by at least the CPU in the processing device among the external clock, the first internal clock and the second internal clock in accordance with any one of the first, second and third interfaces used by the processing device in data transfer with the external terminal device,
wherein, when the system clock is switched among the external clock, the first internal clock and the second internal clock, the processing device causes the CPU to be in a sleep state and performs the switching by the clock control circuit, and after the switching is completed, the processing device releases the sleep state of the CPU to restart an operation, and an external terminal complying with ISO 7816-2, wherein the first interface is an interface for performing data transfer complying with ISO 7816-3, the second interface is an interface for performing USB transfer complying with ISO 7816-12, and the third interface is an interface for performing data transfer with an RF circuit in the external terminal device.

10. The processing device according to claim 9, further comprising:

a reset control circuit that selects a reset signal to be supplied to the processing device in accordance with any one of the first, second, and third interfaces used by the processing device in data transfer with the external terminal device.

11. The processing device according to claim 9, wherein, as interfaces used to perform data transfer with the external terminal device, any of two or more interfaces from the interface for performing data transfer complying with ISO 7816-3, the interface for performing USB transfer complying with ISO 7816-12, and the interface for performing data transfer with the RF circuit in the external terminal device can be simultaneously used.

* * * * *